(12) United States Patent
Mori

(10) Patent No.: US 8,351,086 B2
(45) Date of Patent: Jan. 8, 2013

(54) TWO-DIMENSIONAL CODE GENERATING DEVICE

(75) Inventor: Hiroshi Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1107 days.

(21) Appl. No.: 12/137,289

(22) Filed: Jun. 11, 2008

(65) Prior Publication Data

US 2008/0309981 A1    Dec. 18, 2008

(30) Foreign Application Priority Data

Jun. 18, 2007  (JP) ................................ 2007-160339

(51) Int. Cl.
  *H04N 1/40*   (2006.01)
(52) U.S. Cl. ..................... 358/3.28; 358/1.15; 358/1.18; 235/487
(58) Field of Classification Search .................. 358/3.28, 358/1.15, 1.18; 235/487
  See application file for complete search history.

(56) References Cited

U.S. PATENT DOCUMENTS

| | | | | |
|---|---|---|---|---|
| 5,383,029 | A * | 1/1995 | Kojima | 358/403 |
| 6,067,554 | A * | 5/2000 | Hohensee et al. | 715/209 |
| 7,099,037 | B2 * | 8/2006 | Clark et al. | 358/1.18 |
| 7,552,875 | B2 * | 6/2009 | Slatter et al. | 235/487 |
| 7,788,318 | B2 * | 8/2010 | Kinoshita et al. | 709/203 |

FOREIGN PATENT DOCUMENTS

| | | |
|---|---|---|
| JP | 11-3390 | 1/1999 |
| JP | 2002-091465 | 3/2002 |
| JP | 2007-013371 | 1/2007 |

* cited by examiner

*Primary Examiner* — Twyler Haskins
*Assistant Examiner* — Michael Burleson
(74) *Attorney, Agent, or Firm* — Fitzpatrick, Cella, Harper & Scinto

(57) ABSTRACT

The present invention provides a printing device optimizing information to be embedded by merging pieces of information of respective pages into a single piece of information in N-up printing. The printing device generates the information to be embedded according to a result of analyzing print parameters in print data when performing embedding printing processing of the information to be embedded for the print data in a machine-recognizable manner. That is, in the printing device, a unit of generating information to be embedded acquires respective pieces of information of M pages (1≦M≦N), analyzes the acquired respective pieces of information to be embedded, and generates a single piece of information to be embedded merging the respective pieces of information to be embedded based on the analysis result of the respective pieces of information to be embedded, when N-up printing is designated.

15 Claims, 29 Drawing Sheets

| REGION | PURPOSE | ANALYSIS SPEED | DATA SIZE |
|---|---|---|---|
| FIRST REGION | REAL-TIME DETECTION INFORMATION | SIMILAR TO SCAN SPEED | SMALL SIZE |
| SECOND REGION | NON-REAL-TIME DETECTION INFORMATION | RELATIVELY LOW | LARGE SIZE |

TWO-DIMENSIONAL CODE GENERATING DEVICE

BACKGROUND OF THE INVENTION

1. Field of the Invention

The present invention relates to a technique for generating a two-dimensional code that is printed together with an electronic document when the electronic document is printed.

2. Description of the Related Art

There is known a printing system embedding a machine-recognizable code (a code to be embedded such as a two-dimensional code) into a print image, when printing an electronic document which has been created by use of an application program. This system receives additional information related to the electronic document (hereinafter, called information to be embedded), for example, converts the information to be embedded into the code to be embedded, and then prints the code to be embedded on a sheet for an output together with the electronic document designated to be printed. When this sheet is copied, the sheet is scanned and read by a scanner for detecting the embedded code, embedded information is acquired from the detected embedded code, and print processing is performed according to the embedded information.

Meanwhile, there is known a technique performing the embedding processing according to print setting information. For example, Japanese Patent Laid-Open No. 11-003390 (1999) discloses a technique in which, even when N-up printing is designated and a print image is compressed, a print size of the embedded code is kept constant regardless of a compression ratio of the print image for preventing miss-recognition in the read processing of the embedded code. Here, the N-up printing is a function to compress and print a plurality of pages of documents all together on a single sheet for saving a print cost or a filing space.

In the above printing system, optimization of the information to be embedded is desired for speeding up generation processing of the code to be embedded in printing or speeding up read-scan/recognition processing by the scanner after the printing. In the conventional technique, however, the code to be embedded is generated from the information to be embedded for each page in the N-up printing. Accordingly, there are the following problems in the conventional technique.

Even when there is information common to pages, the code to be embedded is generated for each page individually and the information common to pages is repeatedly embedded in each page.

Generating the codes to be embedded of N pages makes control information used for managing the embedded information redundant.

SUMMARY OF THE INVENTION

An object of the present invention is to optimize the information to be embedded by merging a plurality of pieces of information to be embedded of respective pages into a single piece of information in the N-up printing and thereby to realize improvements of speed and efficiency in the embedding processing of the information to be embedded and the reading processing of the embedded information.

A two-dimensional code generating device of the present invention includes: an acquisition component for acquiring information to be embedded in each page as a two-dimensional code; a determination component for determining whether a plurality of pages are printed on one sheet; a merger component for merging pieces of information to be embedded in each page of a plurality of pages as the two-dimensional codes when the plurality of pages are determined to be printed on one sheet; and a generation component for generating the two dimensional code from the information obtained by the merging in the merger component.

A two-dimensional code generating device of the present invention includes: an acquisition component for acquiring information to be embedded in each page as a two-dimensional code; a determination component for determining whether a plurality of pages are printed on one sheet; a merger component for merging the pieces of information to be embedded in each page of a plurality of pages as the two-dimensional codes into a single piece of information when the plurality of pages are determined to be printed on one sheet; and a generation component for generating one two-dimensional code from the single piece of information obtained by the merging in the merger component.

A two-dimensional code generating device of the present invention includes: a determination component for determining whether a first information to be embedded as a first two-dimensional code and a second information to be embedded as a second two-dimensional code are printed on one sheet; a generation component for generating the first two-dimensional code from the first information and generating the second two-dimensional code from the second information when both of the first information and the second information are determined not to be printed on one sheet; and a generation component for merging the first information and the second information into a single piece of information and generating one two-dimensional code from the single piece of information when both of the first information and the second information are determined to be printed on one sheet.

A two-dimensional code generating method of the present invention includes the steps of: acquiring information to be embedded in each page as a two-dimensional code; determining whether a plurality of pages are printed on one sheet; merging the pieces of information to be embedded in each page of a plurality of pages as the two-dimensional codes when the plurality of pages are determined to be printed on one sheet; and generating the two-dimensional code from the information obtained by the merging in the merging step.

A two-dimensional code generating method of the present invention includes the steps of: acquiring information to be embedded in each page as a two-dimensional code; determining whether a plurality of pages are printed on one sheet; merging the pieces of information to be embedded in each page of a plurality of pages as the two-dimensional codes into a single piece of information when the plurality of pages are determined to be printed on one sheet; and generating one two-dimensional code from the single piece of information obtained by the merging in the merging step.

A two-dimensional code generating method of the present invention includes the steps of: determining whether a first information to be embedded as a first two-dimensional code and a second information to be embedded as a second two-dimensional code are printed on one sheet; generating the first two-dimensional code from the first information and generating the second two-dimensional code from the second information when both of the first information and the second information are determined not to be printed on one sheet; and merging the first information and the second information into a single piece of information and generating one two-dimensional code from the single piece of information when both of the first information and the second information are determined to be printed on one sheet.

A printing device of the present invention generates data for printing N pages of print data on one sheet when N-up printing is designated for the print data, the printing device including: a component for acquiring each piece of information to be embedded associated with each page in the print data; a component for analyzing each piece of the information to be embedded; a component for merging the pieces of information to be embedded associated with respective N pages to be printed on one page when the N-up printing has been determined to be designated in the analysis; and a component for generating a background image data from the information obtained by the merging and combining the background image data with data corresponding to the background image in the print data.

A printing method of the present invention generates data for printing N pages of print data on one sheet when N-up printing is designated for the print data, the printing method including the steps of: acquiring each piece of information to be embedded associated with each page in the print data; analyzing each piece of the information to be embedded; merging the pieces of information to be embedded associated with respective N pages to be printed on one sheet when the N-up printing has been determined to be designated in the analysis; and generating a background image from the information obtained by the merging and combining the background image data with data corresponding to the background image in the print data.

A computer-readable recording medium of the present invention records a program that enables a computer to perform the above methods.

The present invention can realize effective processing in each of embedding the information to be embedded and reading the embedded information and can provide excellent advantages in performances thereof. The reason is that the present invention realizes optimization of the information to be embedded by merging the pieces of the information in respective pages into a single piece of information.

Further features of the present invention will become apparent from the following description of exemplary embodiments (with reference to the attached drawings).

BRIEF DESCRIPTION OF THE DRAWINGS

FIG. 13 is a diagram illustrating characteristics of the information to be embedded in a first region and a second region;

DESCRIPTION OF THE EMBODIMENTS

Hereinafter, preferable embodiments of the present invention will be described with reference to the drawings.
(Entire Configuration of a Printing System)

Figure 1:
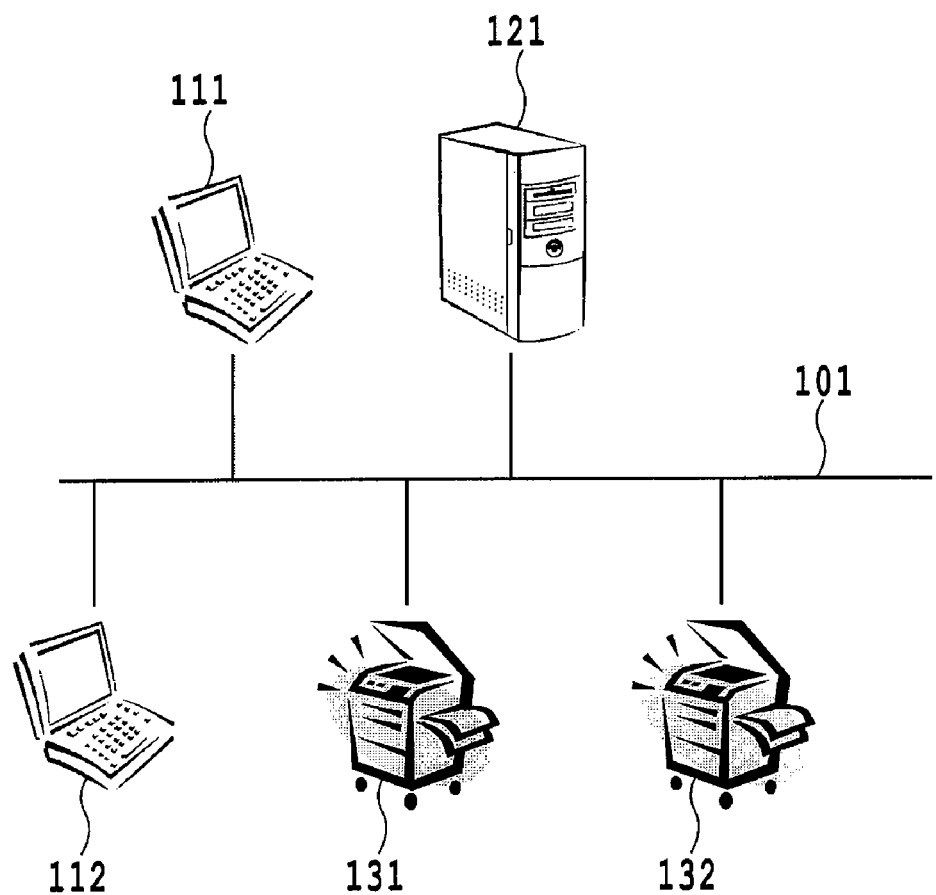
FIG. 1 is a diagram illustrating an example of the entire configuration of a system to which the present invention can be applied.

FIG. 1 is a diagram illustrating an example of the entire configuration of a printing system to which the present invention can be applied.

FIG. 1 shows client PCs 111 and 112, a print server 121, and printing devices 131 and 132 having a copy function and a printer function. These devices are connected by a LAN 101 with one another and mutually communicate via the LAN 101.

The client PC 111 or 112 receives an instruction from a user, generates print data, and transmits the print data to the print server 121.

The print server 121 transmits the received print data to the printing device 131 or 132.

The printing device 131 or 132 converts the received print data into a print image and prints the print image on a sheet. The printing device 131 or 132 generates data for printing N pages of the print data on one sheet when N-up printing is designated for the print data.

The above configuration is an example and the configuration may not include the print server 121. In this case, the client PC 111 or 112 transmits the print data directly to the printing device 131 or 132.

(Embedding Print Processing of the Information to be Embedded)

There will be described embedding print processing of the information to be embedded in the N-up printing with reference to FIG. 2 to FIG. 5.

For the embedding print processing of the information to be embedded, there are a method generating a background image for a print output by the client PC and a method generating the background image by the printing device. The former method will be described with reference to FIG. 2 and FIG. 3 and the latter method will be described with reference to FIG. 4 and FIG. 5. Note that FIG. 2 and FIG. 4 are block diagrams illustrating logic configurations of the client PC and the printing device, and do not show physical configurations thereof.

Figure 2:
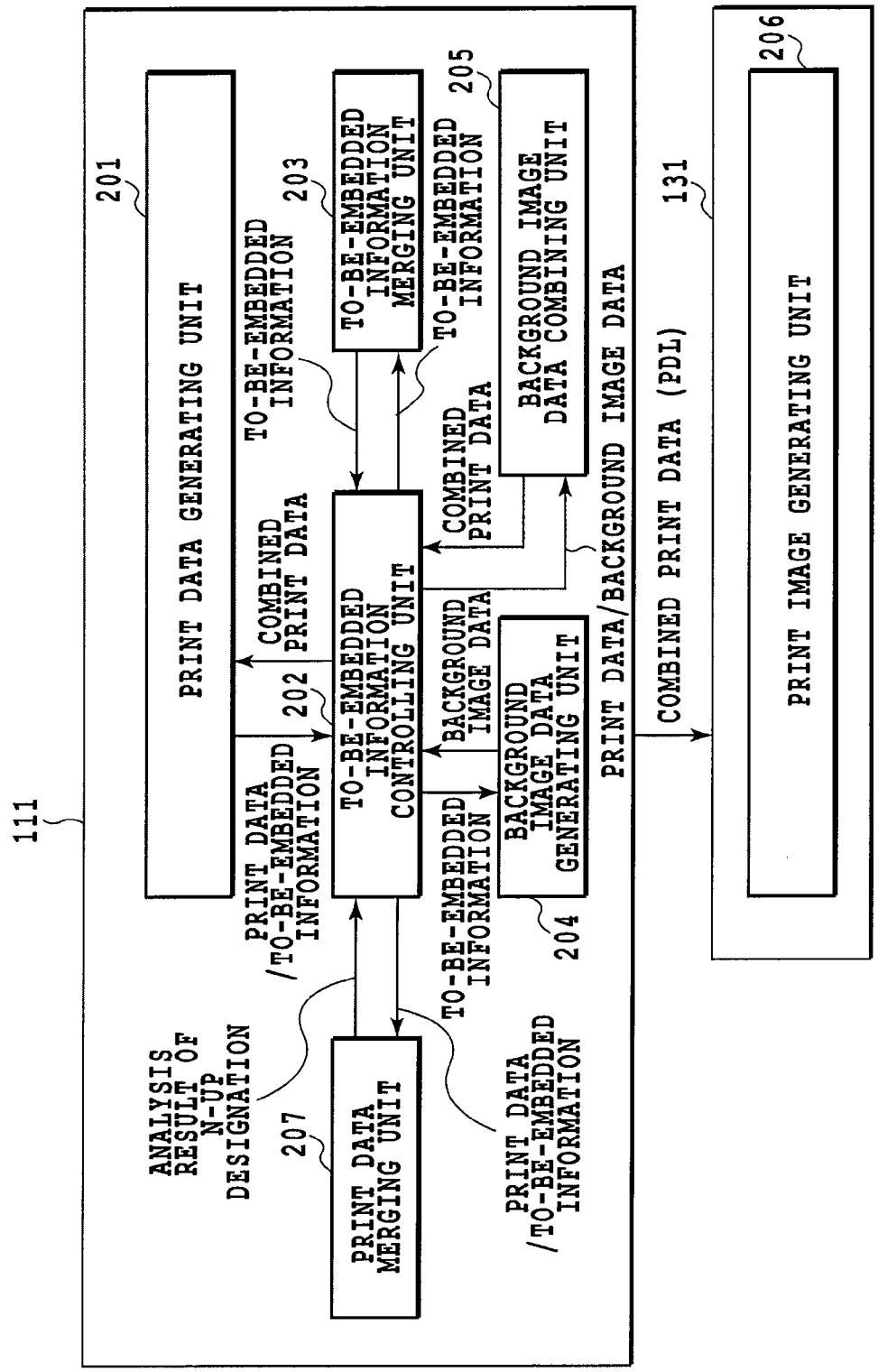
FIG. 2 is a diagram illustrating an example of a configuration for a case in which a client PC generates a background image for a print output.

FIG. 2 is a diagram illustrating an example of a configuration in a case in which the client PC generates a background image for a print output.

In FIG. 2, the client PC is designated by reference numeral 111 and the printing device is designated by reference numeral 131.

First, processing of the client PC 111 will be described.

When a user instructs printing by operating the client PC 111, a print data generating unit 201 is activated. The print data generating unit 201 is a printing subsystem operated in conjunction with a printer driver and an OS. The print data generating unit 201 generates print data, which is a set of drawing commands (e.g., PDL (Page Description Language)) to the printing device 131, from an electronic document which the user instructed for printing.

Note that the print data is composed of a plurality of pages of data in the present embodiment. Also, in the present embodiment, the print data generating unit 201 generates the print data such that each page of data in the print data has a one-to-one corresponding relationship with each page in the electronic documents. Also, the print data generating unit 201 generates information to be embedded at the same time. In the present embodiment, the print data generating unit 201 generates the information to be embedded as follows. That is, the print data generating unit 201 first extracts information such as location information of the electronic documents to be printed, print setting information (N-up printing designation, resolution, compression and decompression, etc.), security information, search information, and the like from the PDL as extracted information. In the present embodiment, this extracted information is extracted in the same number of pieces as the number of pages composing the print data and divided into a plurality of pieces of data. More precisely, the extracted information is extracted from the print data so as to have a one-to-one corresponding relationship with each page of the print data. Subsequently, the print data generating unit 201 generates the information to be embedded based on the extracted information. Note that this information to be embedded, similarly to the extracted information, is divided into a plurality of pieces of data in the same number as the number of pages composing the print data. That is, each of the plurality of pieces of information to be embedded is associated with each page in the print data.

Next, the print data generating unit 201 outputs the generated print data (a plurality of page data) and the information to be embedded (this information to be embedded is divided into a plurality of pieces of data) to a to-be-embedded information controlling unit 202.

The to-be-embedded information controlling unit 202 receives the print data and the information to be embedded from the print data generating unit 201. Then, the to-be-embedded information controlling unit 202 outputs the information to be embedded to a to-be-embedded information merging unit 203, and further outputs the print data and the information to be embedded to a print data merging unit 207.

Hereinafter, in the present embodiment, each of the plurality of pieces of data in the information to be embedded is referred to as first information to be embedded. Also, each of the plurality of pieces of data in the print data is referred to as first print data. Further, each of the plurality of pieces of data in the extracted information is referred to as first extracted information.

The print data merging unit 207 analyzes the N-up printing designation included in the received first information to be embedded, and determines whether to perform merger processing of the print data in each page (the first print data). Specifically, the print data merging unit 207 determines to perform the merger processing of the first print data of each page when N is two or more, and determines not to perform the merger processing of the first print data of each page when N is one.

The to-be-embedded information merging unit 203 performs the merger processing of the plurality of pieces of data in the information to be embedded (a plurality of pieces of the first information to be embedded). The merger processing merges the pieces of information to be embedded associated with respective N pages to be printed on one sheet when the N-up printing is determined to be designated in analysis. In the present embodiment, the to-be-embedded information merging unit 203 performs the following processing.

The to-be-embedded information merging unit 203 analyzes the N-up printing designation included in the received first information to be embedded, and determines whether to perform the merger processing of the first information to be embedded in each page. Specifically, the to-be-embedded information merging unit 203 determines to perform the merger processing of the first information to be embedded corresponding to each page when N is two or more, and determines not to perform the merger processing of the first information to be embedded corresponding to each page when N is one. The to-be-embedded information merging unit 203 optimizes the first information to be embedded by merging the pieces of information to be embedded in respective pages when having determined to perform the merger processing. In the present embodiment, a result of the merger of the first information to be embedded is referred to as second information to be embedded. Then, the to-be-embedded information merging unit 203 outputs the second information to be embedded to the to-be-embedded information controlling unit 202. On the other hand, when having determined not to perform the merger processing, the to-be-embedded information merging unit 203 outputs the first information to be embedded as is, without performing the merger processing, to the to-be-embedded information controlling unit 202. Details of this processing will be described hereinafter.

The to-be-embedded information controlling unit 202 outputs the second information to be embedded received from the to-be-embedded information merging unit 203 to a background image data generating unit 204.

The background image data generating unit 204 generates background image data using the second information to be embedded received from the to-be-embedded information controlling unit 202. Specifically, the background image data generating unit 204 performs the following processing.

The background image data generating unit 204 generates the background image data based on the second information to be embedded received from the to-be-embedded information controlling unit 202. The background image data is generated by use of a LVBC (Low Visibility Barcode), for example. Details of the LVBC will be described hereinafter. Then, the background image data generating unit 204 outputs the generated background image data to the to-be-embedded information controlling unit 202.

A background image data combining unit 205 receives each piece of the first print data and the background image data corresponding to the each piece of the first print data from the to-be-embedded information controlling unit 202. Then, the background image data combining unit 205 combines each piece of the received first print data with the background image data corresponding to the each of the received first print data to generate combined print data. Note that the background image data combining unit 205 may not perform actual synthesis processing and may generate data for enabling the printing device to combine each piece of the first print data with the background image data corresponding to the each piece of the first print data. In such a case, the data which may be generated becomes synthesis print data, which includes a print command to insert the background image data into the data of each page in the print data (first print data). The background image data combining unit 205 outputs the generated combined print data to the to-be-embedded information controlling unit 202.

The to-be-embedded information controlling unit 202 outputs the received combined print data to the print data generating unit 201.

The print data generating unit 201 outputs the received combined print data to the print server 121 (not shown in the drawing) and the printing device 131 or 132.

Next, processing of the printing device 131 will be described.

The printing device 131 is provided with a print image generating unit 206. The print image generating unit 206 includes a data receiving unit (not shown in the drawing) and receives data from the LAN by controlling a network interface. The data receiving unit, upon receiving data from the client PC 111 or another node on the LAN, outputs the received data to an appropriate subsystem according to kinds of the data. When a communication method uses the TCP/IP, for example, discrimination of the type of the data is generally performed by port numbers. In the present embodiment, the received data is the combined print data including print commands for the printing device 131.

The print image generating unit 206 retrieves a drawing command (PDL) from the combined print data received by the data receiving unit, interprets the drawing command, and generates intermediate data for an internal use of the printing device 131. The printing device 131 controls the RIP, converts the intermediate data into a print image, and prints the image on a sheet.

Figure 3:
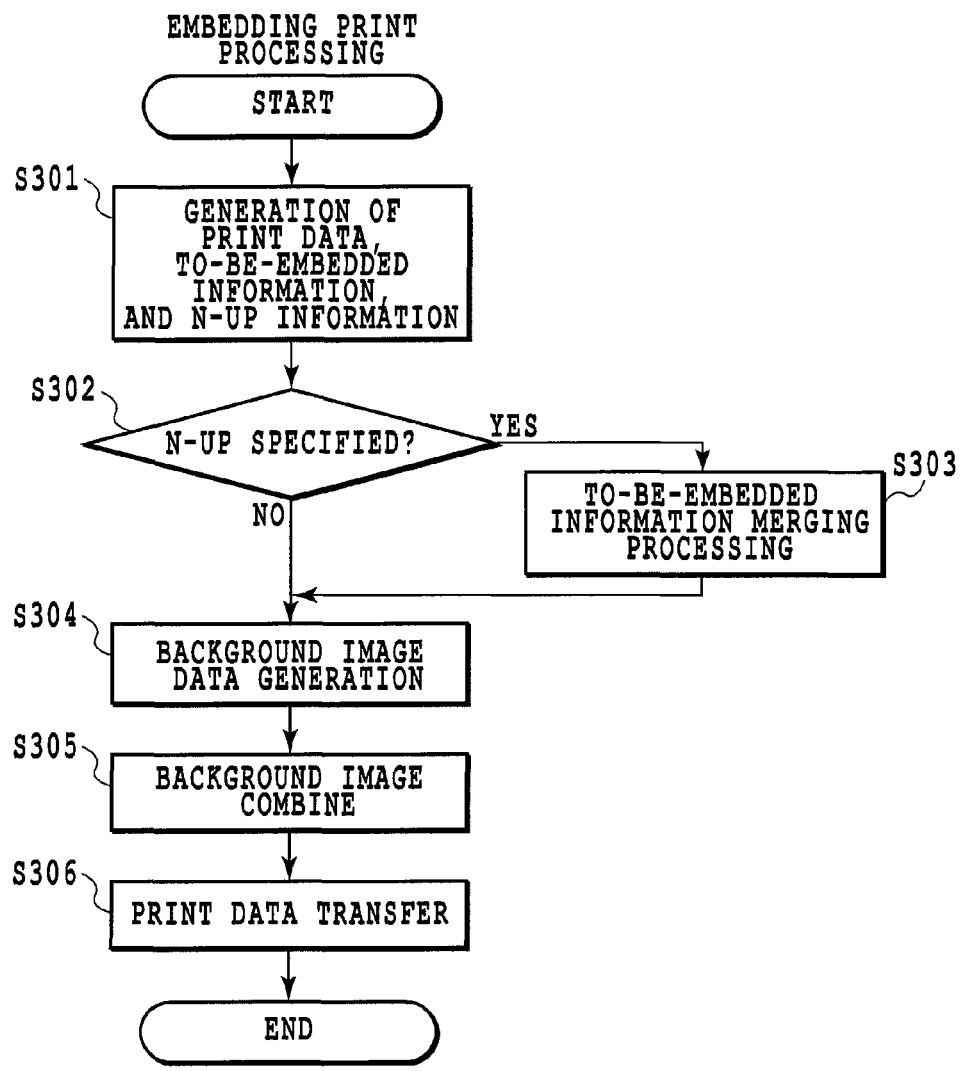
FIG. 3 is a flowchart of an embedding print processing flow in the configuration shown in FIG. 2.
Figure 4:
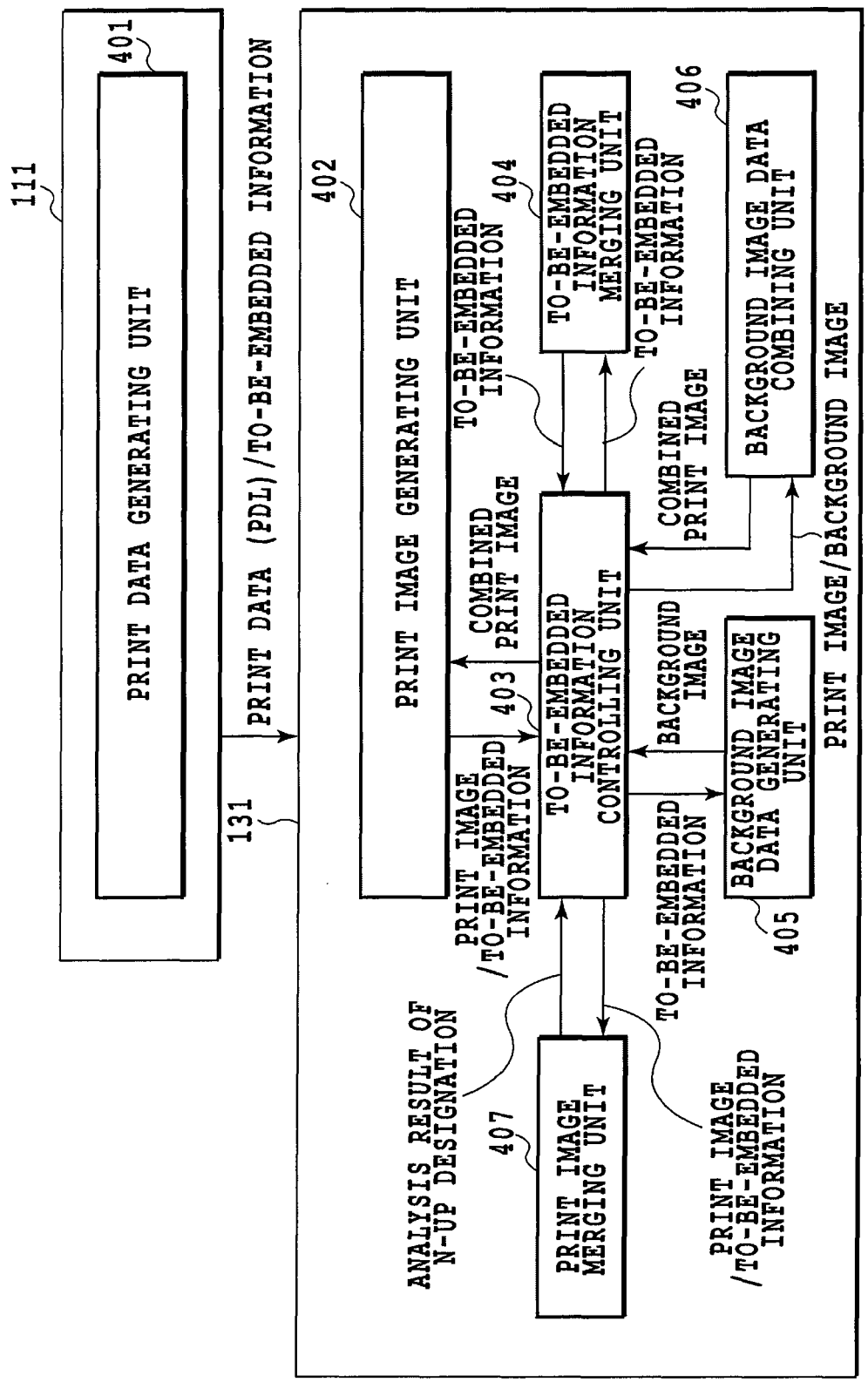
FIG. 4 shows an example of a configuration for a case in which a printing device generates a background image for a print output.

FIG. 3 is a flowchart illustrating an embedding print processing flow in the configuration shown in FIG. 2.

In S301, the print data generating unit 201 generates the first print data and the first information to be embedded, and outputs the generated first print data and the first information to be embedded to the to-be-embedded information controlling unit 202. Then, the to-be-embedded information controlling unit 202 outputs the information to be embedded to the to-be-embedded information merging unit 203, and further outputs the first print data and the first information to be embedded to the print data merging unit 207.

In S302, the print data merging unit 207 analyzes the N-up printing designation included in the received first information to be embedded, and determines whether to perform the merger processing of the first print data of each page. Specifically, the print data merging unit 207 determines to perform the merger processing of the first print data of each page when N is two or more, and determines not to perform the merger processing of the first print data of each page when N is one.

In S303, the to-be-embedded information merging unit 203 optimizes the first information to be embedded by performing the merger processing of the plurality of pieces of the first information to be embedded to generate the second information to be embedded. The to-be-embedded information merging unit 203 outputs the generated second information to be embedded to the to-be-embedded information controlling unit 202. Then, the to-be-embedded information controlling unit 202 outputs the second information to be embedded to the background image data generating unit 204.

In S304, the background image data generating unit 204 generates the background image data using the second information to be embedded received from the to-be-embedded information controlling unit 202 and outputs the generated background image data to the to-be-embedded information controlling unit 202.

In S305, the background image data combining unit 205 receives each piece of the first print data and the background image data corresponding to the each piece of the first print data from the to-be-embedded information controlling unit 202. Then, the background image data combining unit 205 combines each piece of the received first print data with the background image data corresponding to the each piece of the first print data to generate combined print data. Subsequently, the background image data combining unit 205 outputs the generated combined print data to the to-be-embedded information controlling unit 202.

In S306, the to-be-embedded information controlling unit 202 outputs the received combined print data to the print server 121 and the printing device 131 or 132.

FIG. 4 is a diagram illustrating an example of a configuration for a case in which the printing device generates the background image for a print output.

In FIG. 4, reference numeral 111 denotes the client PC and reference numeral 131 denotes the printing device.

First, processing of the client PC 111 will be described.

When the user instructs printing by operating the client PC 111, a print data generating unit 401 is activated. The print data generating unit 401 is a printing subsystem operated in conjunction with a printer driver and an OS. The print data generating unit 401 generates the first print data, which is a set of drawing commands (e.g., PDL) for the printing device 131, from an electronic document which the user instructed for printing. At this time, the print data generating unit 401 generates the first information to be embedded as well. For example, from the PDL, the print data generating unit 401 extracts parameters of the information to be embedded composed of the location information of the electronic document to be printed, print setting information (N-up printing designation, resolution, compression and decompression or the like), security information, search information, etc. Then, the print data generating unit 401 generates the first information to be embedded based on the extracted parameters of the information to be embedded. Subsequently, the print data generating unit 401 outputs the generated first print data and first information to be embedded to the printing device 131 or 132 and the print server 121 (not shown in the drawing).

Next, processing of the printing device 131 will be described.

A print image generating unit 402 is provided with a data receiving unit (not shown in the drawing) and receives data from the LAN by controlling a network interface. The data receiving unit, on receiving data from the client PC 111 or another node on the LAN, outputs the received data to an appropriate subsystem according to the type of the data. When a communication method uses the TCP/IP, for example, discrimination of the type of the data is generally performed by port numbers. In the present embodiment, the received data includes the first print data (PDL) including print commands for the printing device 131 and the first information to be embedded. The print image generating unit 402 retrieves the first information to be embedded and the first print data from the data received by the data receiving unit, interprets the first print data, and generates the intermediate data for the internal use of the printing device 131. Then, the printing device 131 controls the RIP, and converts the intermediate data into a first print image.

The print image generating unit 402 outputs the first print image and the first information to be embedded to a to-be-embedded information controlling unit 403.

The to-be-embedded information controlling unit 403 receives the first print image and the first information to be embedded from the print image generating unit 402. Then the to-be-embedded information controlling unit 403 outputs the first information to be embedded to a to-be-embedded information merging unit 404 and further outputs the first print image and the first information to be embedded to a print image merging unit 407.

The print image merging unit 407 analyzes the N-up printing designation included in the received first information to be embedded, and determines whether to perform merger processing of the print image of each page (first print image). Specifically, the print image merging unit 407 determines to perform the merger processing of the first print image of each page when N is two or more, and determines not to perform the merger processing of the first print image of each page when N is one.

The to-be-embedded information merging unit 404 performs the merger processing of a plurality of pieces of data in the information to be embedded (a plurality of pieces of the first information to be embedded).

The to-be-embedded information merging unit 404 analyzes the N-up printing designation included in the received first information to be embedded, and determines whether to perform the merger processing of the first information to be embedded in each page. Specifically, the to-be-embedded information merging unit 404 determines to perform the merger processing of the first information to be embedded corresponding to each page when N is two or more, and determines not to perform the merger processing of the first information to be embedded corresponding to each page when N is one. The to-be-embedded information merging unit 404, when having determined to perform the merger processing, optimizes the first information to be embedded by merging the pieces of first information to be embedded in the respective pages to generate the second information to be embedded. Then, the to-be-embedded information merging unit 404 outputs the second information to be embedded to the to-be-embedded information controlling unit 403. On the other hand, when having determined not to perform the merging processing, the to-be-embedded information merging unit 404 outputs the fist information to be embedded as is, without providing the merger processing, to the to-be-embedded information controlling unit 403. Details of this processing will be described hereinafter.

The to-be-embedded information controlling unit 403 outputs the second information to be embedded received from the to-be-embedded information merging unit 404 to a background image data generating unit 405.

The background image data generating unit 405 generates a background image using the second information to be embedded received from the to-be-embedded information controlling unit 403. Specifically, the background image data generating unit 405 performs the following processing.

The background image data generating unit 405 generates the background image using the second information to be embedded received from the to-be-embedded information controlling unit 403. The background image is generated using the LVBC, for example. Details of the LVBC will be described hereinafter. Then, the background image data generating unit 405 outputs the generated background image to the to-be-embedded information controlling unit 403.

A background image data combining unit 406 receives the each first print image and the background image corresponding to the each first print image from the to-be-embedded information controlling unit 403. Then, the background image data combining unit 406 combines the each received first print image with the background image corresponding to the each first print image to generate a combined print image. Note that the background image data combining unit 406 may not perform actual synthesis processing and may generate data enabling the printing device 131 to combine the each first print image with the background image corresponding to the each first print image. In such a case, the data which may be generated becomes the synthesis print data. The background image data generating unit 405 outputs the generated combined print data to the to-be-embedded information controlling unit 403.

The to-be-embedded information controlling unit 403 outputs the received combined print image to the print image generating unit 402.

The print image generating unit 402 prints the combined print image received from the to-be-embedded information controlling unit 403 on a sheet.

Figure 5:
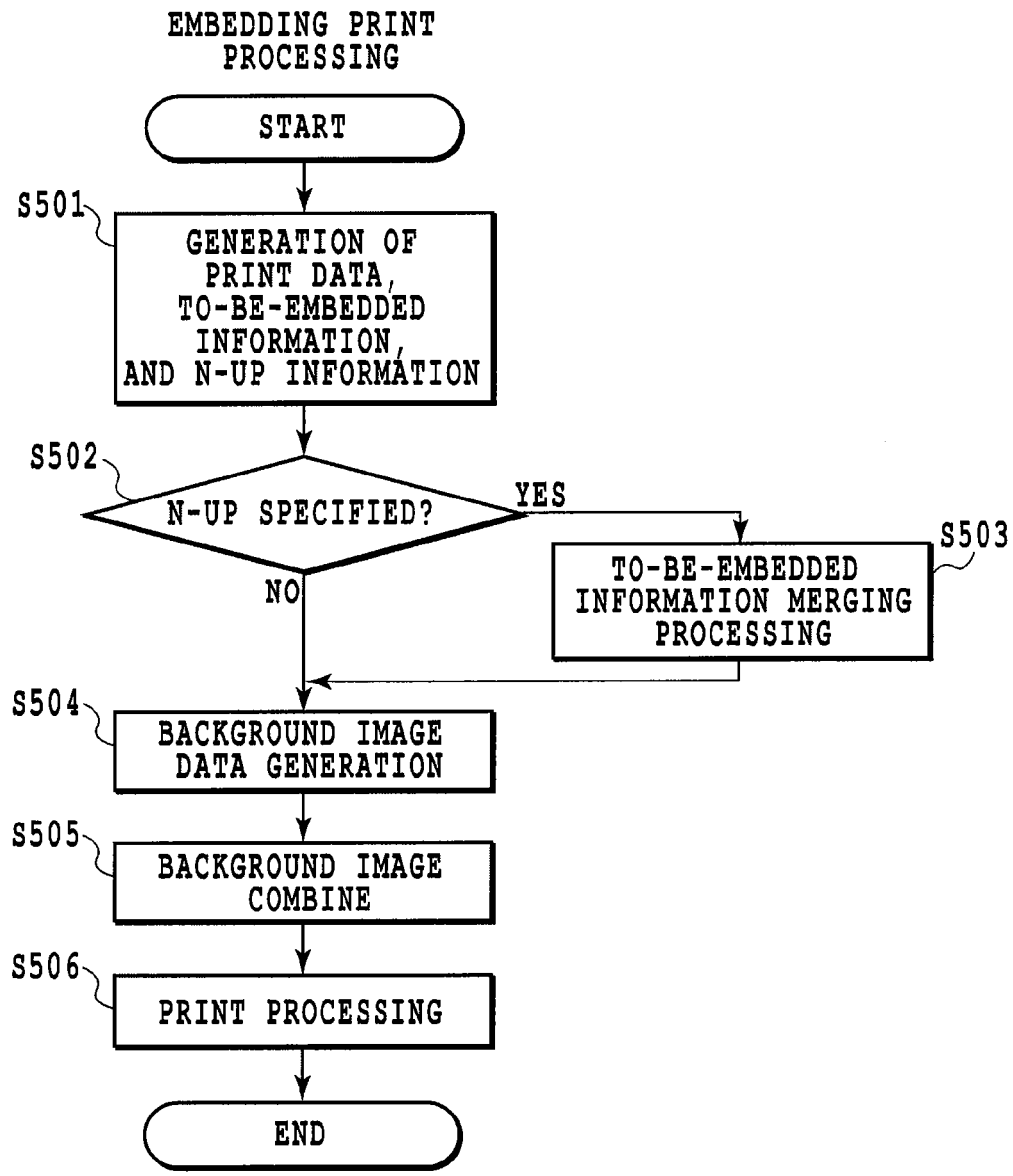
FIG. 5 is a flowchart of the embedding print processing flow in the configuration shown in FIG. 4.

FIG. 5 is a flowchart of the embedding print processing flow in the configuration shown in FIG. 4.

In S501, the print data generating unit 401 generates the first print data and the first information to be embedded, outputs the generated first print data and first information to be embedded to the print image generating unit 402. The print image generating unit 402 retrieves the first information to be embedded and the first print data from the received data, interprets the first print data to generate the intermediate data for the internal use of the printing device 131, and converts the intermediate data into the first print image. The print image generating unit 402 outputs the first print image and the first information to be embedded to the to-be-embedded information controlling unit 403.

The to-be-embedded information controlling unit 403 receives the first print image and the first information to be embedded from the print image generating unit 402. Then, the to-be-embedded information controlling unit 403 outputs the first information to be embedded to the to-be-embedded information merging unit 404, and further outputs the first print image and the first information to be embedded to the print image merging unit 407.

In S502, the print image merging unit 407 analyzes the N-up printing designation included in the received first information to be embedded, and determines whether to perform the merger processing of the first print image in each page.

Specifically, the print image merging unit 407 determines to perform the merger processing of the first print image in each page when N is two or more, and determines not to perform the merger processing of the first print image in each page when N is one.

In S503, the to-be-embedded information merging unit 404 analyzes the N-up printing designation included in the received first information to be embedded, and determines whether to perform the merger processing of the first information to be embedded in each page. Specifically, the to-be-embedded information merging unit 404 determines to perform the merger processing of the first information to be embedded corresponding to each page when N is two or more, and determines not to perform the merger processing of the first information to be embedded corresponding to each page when N is one. The to-be-embedded information merging unit 404, when having determined to perform the merger processing, optimizes the first information to be embedded by merging pieces of the first information to be embedded of the respective pages to generate the second information to be embedded. Then, the to-be-embedded information merging unit 404 outputs the second information to be embedded to the background image data generating unit 405.

In S504, the background image data generating unit 405 generates a background image using the second information to be embedded received from the to-be-embedded information controlling unit 403, and outputs the generated background image to the to-be-embedded information controlling unit 403.

In S505, the background image data combining unit 406 receives the each first print image and the background images corresponding to the each first print image from the to-be-embedded information controlling unit 403. Then the background image data combining unit 406 combines the each first print image with the background image corresponding to the each print image to generate the combined print data. Note that the background image data combining unit 406 may not perform the actual synthesis processing and may generate data enabling the printing device 131 to combine the each first print image with the background image corresponding to the each first print image. In such a case, the data which may be generated becomes the synthesis print data. Then the background image data combining unit 406 outputs the generated combined print image to the to-be-embedded information controlling unit 403.

In S506, the to-be-embedded information controlling unit 403 outputs the received combined print image to the print server 121 and the printing device 131.

(Merger Processing of the Information to be Embedded)

There will be described the merger processing of the information to be embedded by the to-be-embedded information merging unit 203 or 404 with reference to FIG. 6 and FIG. 7.

Figure 6:
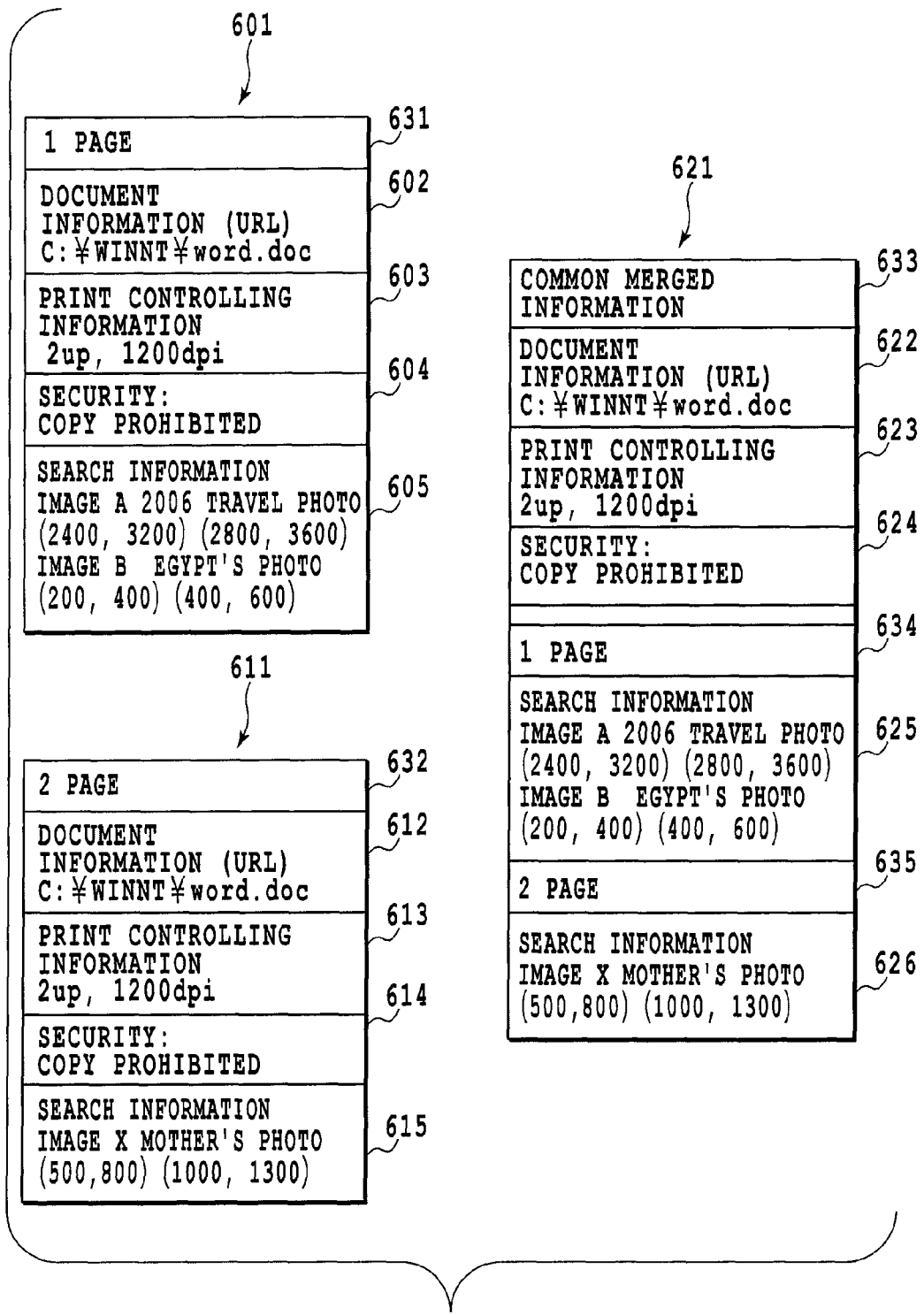
FIG. 6 is a diagram illustrating specific contents of information to be embedded.

FIG. 6 is a diagram illustrating specific contents of the information to be embedded.

Reference numerals 601 and 611 denote the first information to be embedded of each page and reference numeral 621 denotes the merged information to be embedded, that is, the second information to be embedded.

As described above, the first information to be embedded is generated on the basis of the information extracted from the PDL by the print data generating unit 201 or 401. The present embodiment generates the first information to be embedded on the basis of the parameters of the first information to be embedded extracted from the PDL, but the first information to be embedded may be generated using another method.

Reference numerals 602 to 605 and 612 to 615 denote the parameters of the first information to be embedded. These parameters are embedded into respective pages as the first information to be embedded. Reference numerals 631 and 632 are header information and indicate page numbers in the present embodiment.

Reference numeral 621 denotes the second information to be embedded which is newly generated by extraction of common items from the respective pieces of information denoted by reference numerals 601 and 611. That is, reference numeral 621 denotes the second information to be embedded merging the first information to be embedded of the first page 601 and the first information to be embedded of the second page 611.

Reference numerals 622 to 626 in the second information to be embedded 621 denote the respective parameters of the merged first information to be embedded. Reference numerals 622 to 624 denote the parameters common to the respective pages. Reference numerals 625 and 626 denote the parameters specific to the respective pages. Reference numerals 633, 634, and 635 are header information. Reference numeral 633 indicates that reference numerals 622 to 624 are the parameters common to pages. Reference numerals 634 and 635 denote page numbers.

Figure 7:
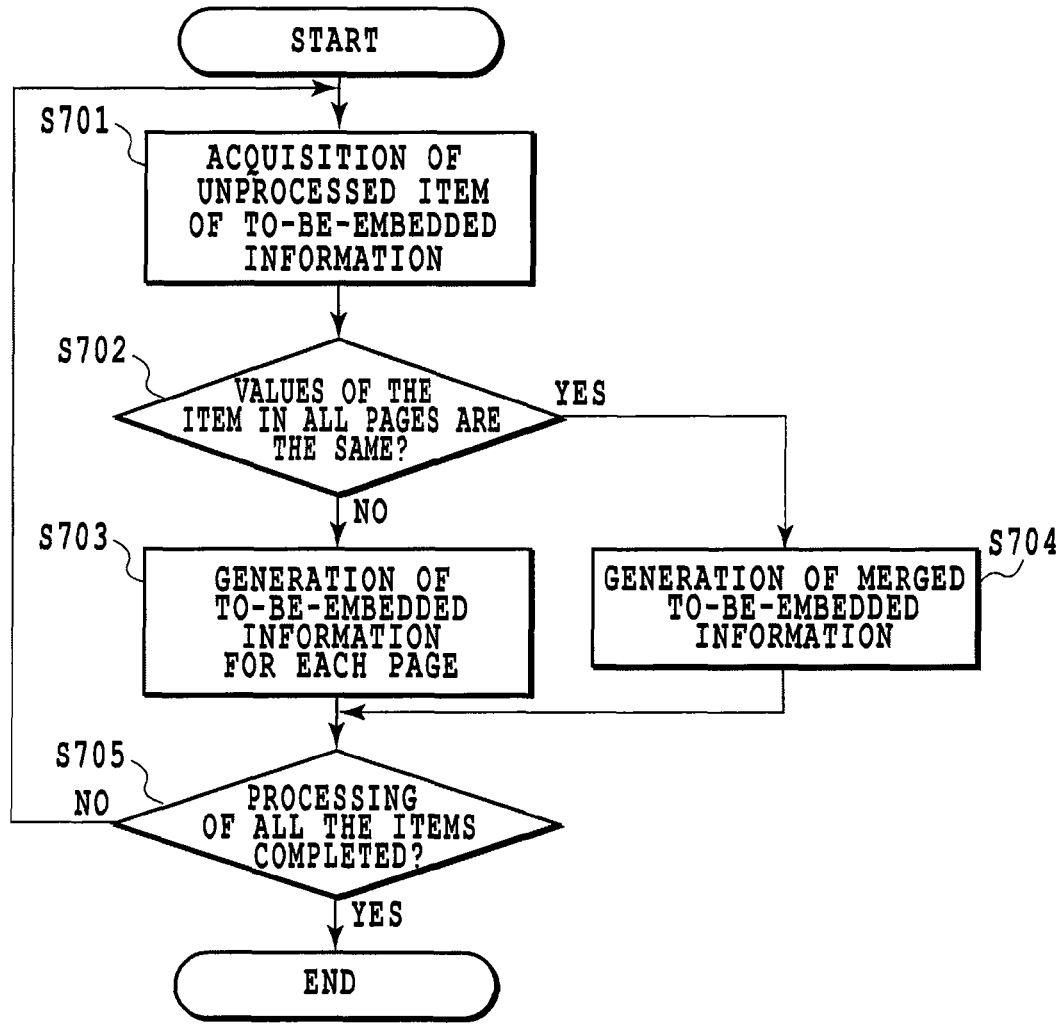
FIG. 7 is a flowchart illustrating merger processing flow of the information to be embedded.

FIG. 7 is a flowchart illustrating a flow of the processing (merger processing) to generate the second information to be embedded by merging pieces of the first information to be embedded.

The to-be-embedded information merging unit 203 or 404 analyzes each parameter value in the first information to be embedded of each page designated for the N-up printing, and merges pieces of the first information to be embedded common to the respective pages according to the analysis result to generate the second information to be embedded.

In S701, the to-be-embedded information merging unit 203 or 404 acquires parameters of unprocessed items which have not been provided with the merger processing. Here, the to-be-embedded information merging unit 203 or 404 acquires all the parameters of pages to be printed on the same page by the N-up printing designation.

In S702, the to-be-embedded information merging unit 203 or 404 determines whether parameter values of M pages ($1 \leq M \leq N$) in the unprocessed items are the same. The item unit, for example, "document information (URL)" 602 or 612, "print control information" 603 or 613, "Security" 604 or 614, "search information" 605 or 615, or the like. The to-be-embedded information merging unit 203 or 404 compares the parameters for each of the same items. If the parameters are different from each other in the comparison result, the process goes to S703, and if the parameters are the same as each other, the process goes to S704.

In S703, the to-be-embedded information merging unit 203 or 404 generates the second information to be embedded for each of the pages. Specifically, the to-be-embedded information merging unit 203 or 404 merges parameters different between pages as shown by reference numerals 605 and 615 into the second information to be embedded specific to each of the pages as shown by reference numerals 625 and 626.

In S704, the to-be-embedded information merging unit 203 or 404 generates the second information to be embedded common to pages. Specifically, the to-be-embedded information merging unit 203 or 404 merges pieces of the first information to be embedded common to all the pages to be N-up printing processed such as indicated by reference numerals 602 and 612, 603 and 613, or 604 and 614 to generate the second information to be embedded.

In S705, the to-be-embedded information merging unit 203 or 404 determines whether the merger is completed for the first information to be embedded in all the items. By repeating the processing of S701 to S705, the merger is performed for the items of all pages to be N-up printing processed and the second information to be embedded is generated.

As described above, the present embodiment performs processing to merge a plurality of pieces of the first information to be embedded, which are respectively associated with a plurality of logical pages, into a single piece of information on one physical page (page to be printed on one sheet) to generate the second information to be embedded. Accordingly, in 2-up processing, the first information to be embedded, which is related to two logical pages, is merged on one physical page and printed as the second information to be embedded.

(Extraction Processing of the Embedded Information and Copy Processing According to the Extracted Embedded Information)

With reference to FIG. 8 to FIG. 11, there will be described extraction processing of the embedded information and copy processing according to the extracted embedded information.

Figure 8:
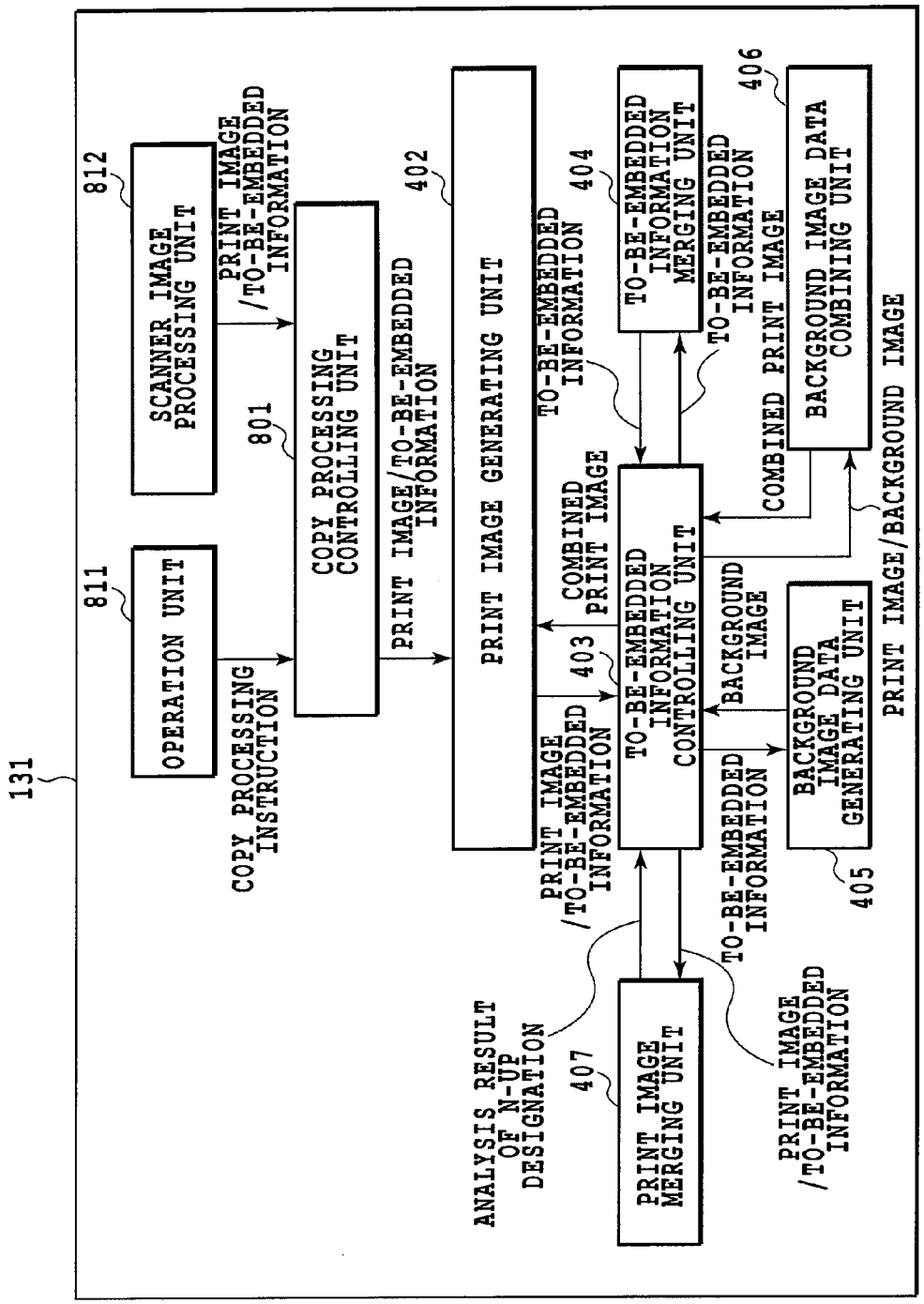
FIG. 8 is a diagram illustrating an example of a configuration for a case of carrying out copy processing of a sheet surface having the embedded information.

FIG. 8 is a diagram illustrating a configuration example of the printing device 131 carrying out the copy processing of a sheet surface having embedded information.

Figure 9:
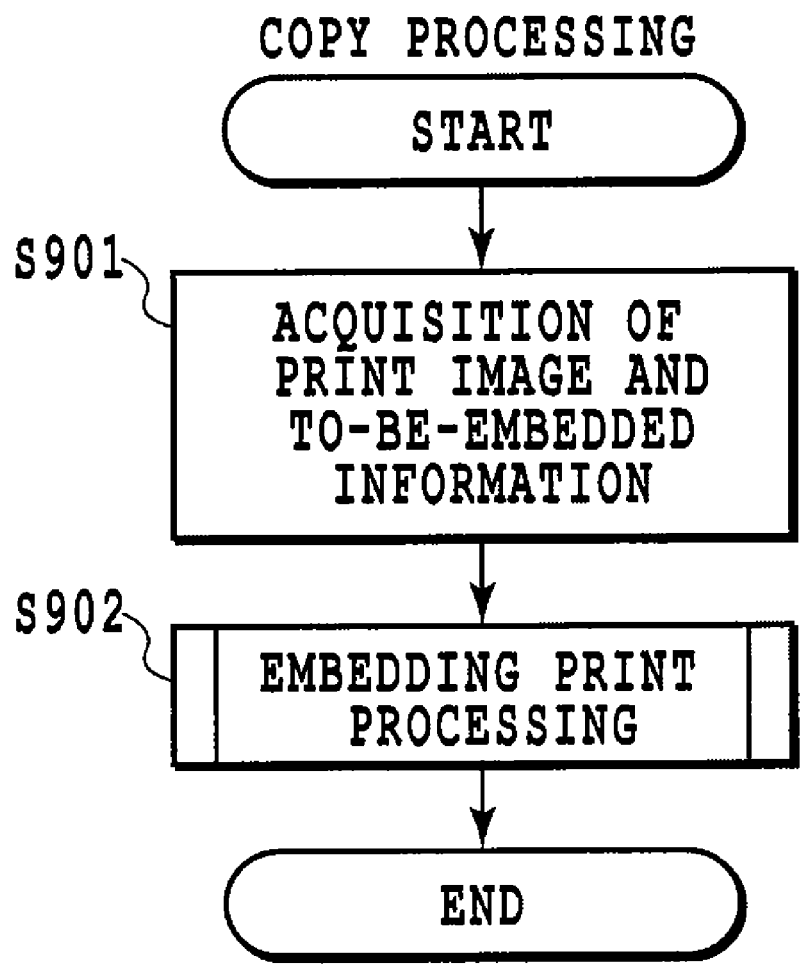
FIG. 9 is a flowchart illustrating the copy processing flow in the configuration shown in FIG. 8.

FIG. 9 is a flowchart illustrating a copy processing flow in the configuration shown in FIG. 8.

In S901, a copy processing controlling unit 801, upon receiving an instruction of the copy processing from an operation unit 811, acquires a print image and embedded information from a scanner image processing unit 812. The print image is an image from which a background image is removed. The scanner image processing unit 812 acquires the print image and the embedded information from a sheet surface using a publicly known scanning technique and a LVBC technique to be described hereinafter.

In S902, the copy processing controlling unit 801 outputs the acquired print image and embedded information to a print image generating unit 402 which performs the to-be-embedded information print processing of the information to be embedded as described with reference to FIG. 4 and FIG. 5.

Configurations and operations of the print image generating unit 402, a to-be-embedded information controlling unit 403, a to-be-embedded information merging unit 404, a background image data generating unit 405, a background image data combining unit 406, and a print image merging unit 407 are the same as in the processing described with reference to FIG. 4 and FIG. 5, and description thereof will be omitted.

Figure 10:
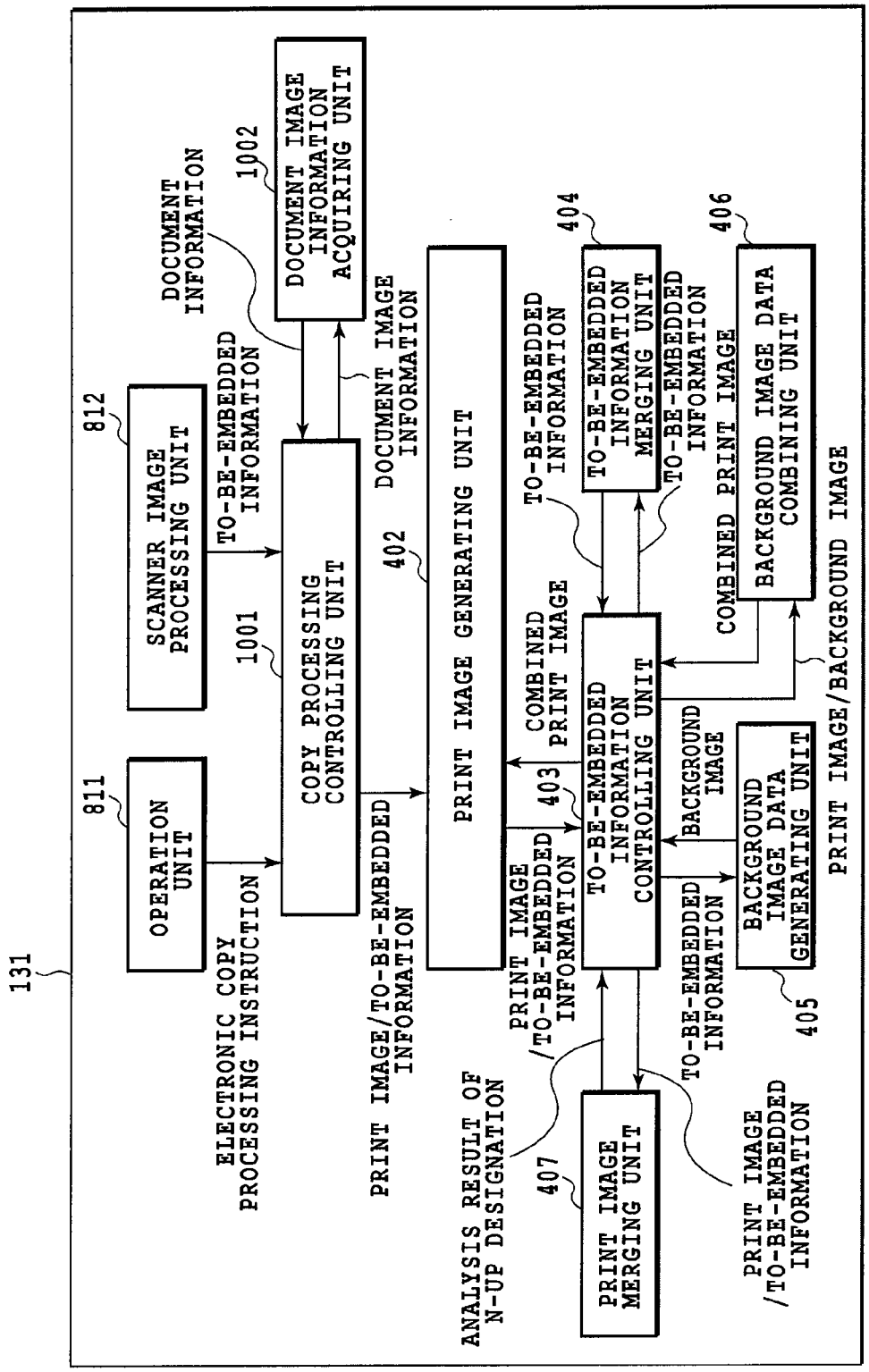
FIG. 10 is a diagram illustrating an example of a configuration in a case of carrying out electronic copy processing of a sheet surface having the embedded information.

FIG. 10 is a diagram illustrating an example of a configuration in a case of carrying out electronic copy processing of a sheet surface having the embedded information.

Figure 11:
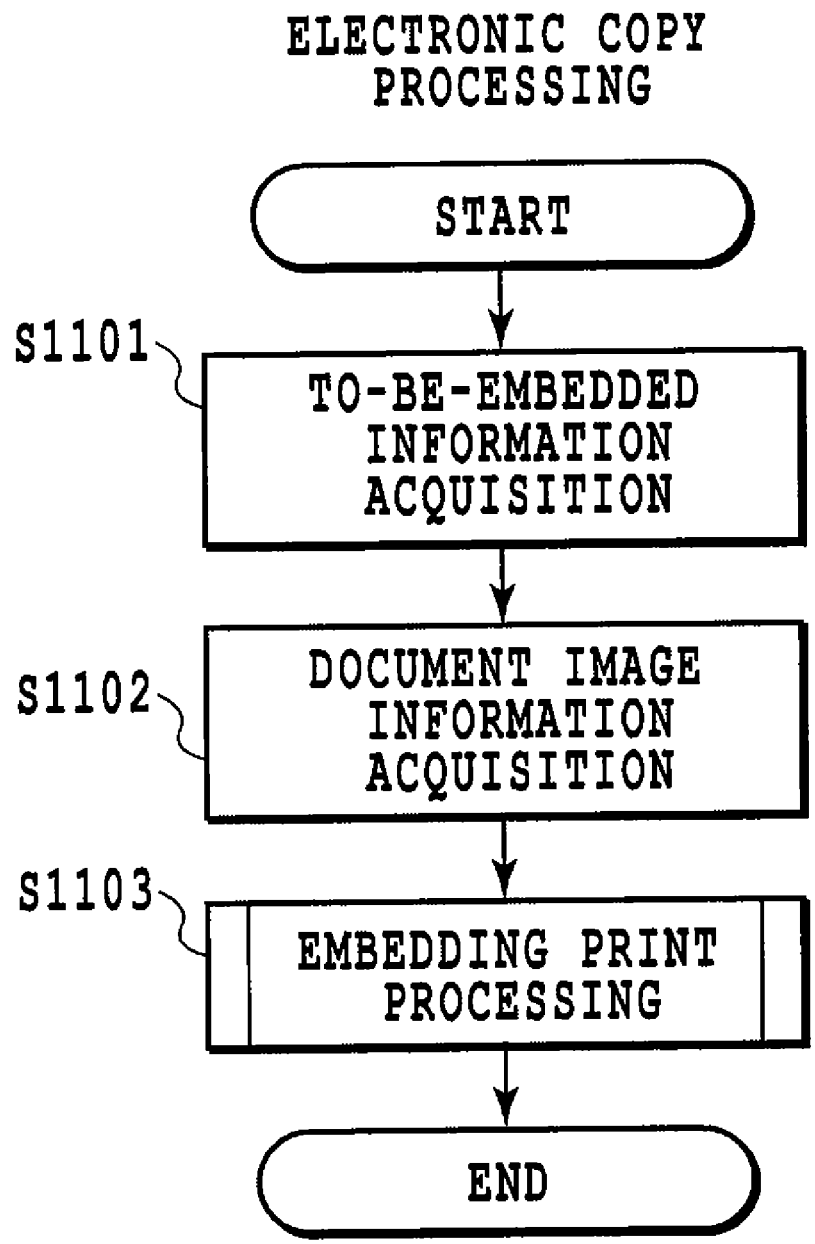
FIG. 11 is a flowchart of the electronic copy processing flow in the configuration shown in FIG. 10.

FIG. 11 is a flowchart illustrating an electronic copy processing flow in the configuration shown in FIG. 10.

In S1101, a copy processing controlling unit 1001, upon receiving an instruction of the electronic copy processing from the operation unit 811, acquires the embedded information from a scanner image processing unit 812 (S1101). The scanner image processing unit 812 extracts the embedded information using the publicly known scanning technique and the LVBC technique to be described below from a sheet surface.

In S1102, the copy processing controlling unit 1001 acquires document image information from the extracted embedded information and outputs the document image information to a document image information acquiring unit 1002. The document image information acquiring unit 1002 outputs document information to the copy processing controlling unit 1001. The document information unit, for example, a URL indicating a location of an electronic document. Also, the document image information unit, for example, application information such as an open format or a bitmap.

In S1103, the copy processing controlling unit 1001 outputs the received document information and embedded information to the print image generating unit 402 which performs the to-be-embedded print processing of the embedded information as described with reference to FIG. 4 and FIG. 5.

Configurations and operations of the print image generating unit 402, a to-be-embedded information controlling unit 403, a to-be-embedded information merging unit 404, a background image data generating unit 405, a background image data combining unit 406, and a print image merging unit 407 are the same as in the processing described with reference to FIG. 4 and FIG. 5, and description thereof will be omitted.

(LVBC)

Next, as an example of an information embedding technique, there will be described a technique using the LVBC (Low Visibility Barcode) which is a kind of two-dimensional code.

In the present embodiment, the printing device prints desired additional information (hereinafter called information to be embedded) together with a document image on a sheet such as a paper, OHP sheet, etc.

Generally, requirements for embedding information are as follows.

Capability of embedding information to be embedded having a sufficient amount of information on a sheet Capability of extracting the embedded information embedded using color material (toner, ink, etc.) on a sheet afterward without fail as digital information.

Durability against factors disturbing the extraction of the embedded information (rotation, expansion, compression or partial deletion of a document, signal deterioration by copying, dirt, or the like) in copying a document image onto a sheet.

Capability of extracting the embedded information in real-time or a similar speed in copying for preventing a document having embedded information indicating copy prohibition from being copied.

Figure 12:
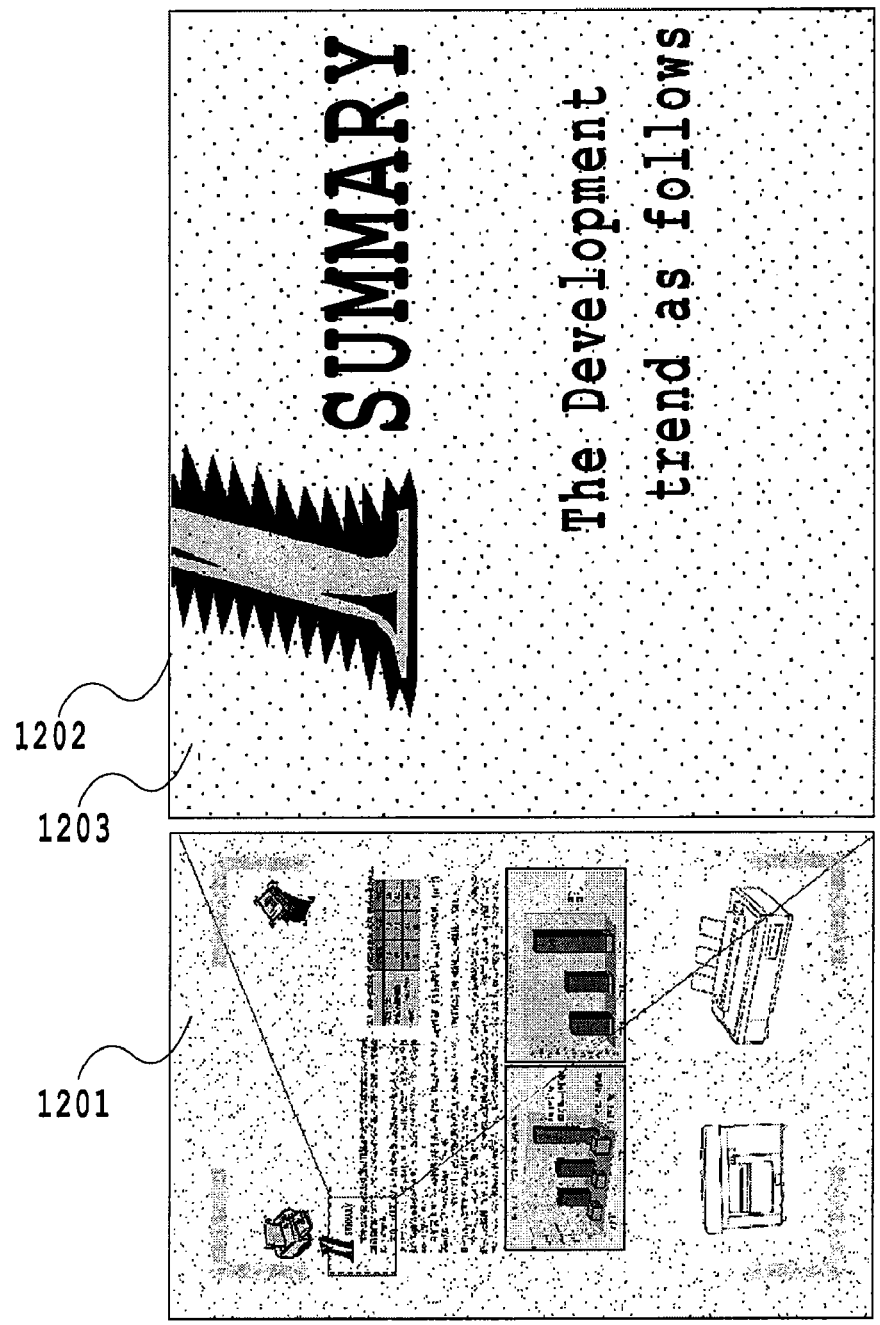
FIG. 12 is a diagram illustrating an example of a document having an embedded LVBC.

FIG. 12 is a diagram illustrating an example of a document having the embedded LVBC.

Reference numeral 1201 shows an entire sheet and Reference numeral 1202 shows an enlarged diagram of the sheet shown by Reference numeral 1201. With reference to the drawing shown by Reference numeral 1202, many dots 1203 are printed on the sheet other than an image originally drawn on a document. In the information embedding technique using the LVBC, the information to be embedded is embedded in a sheet via these dots.

(Two Regions for Embedding the Information to be Embedded)

Next, a region for embedding the information to be embedded will be described. The region is divided into a first region and a second region.

FIG. 13 is a diagram illustrating characteristics of the information to be embedded in the first region and the second region.

The information to be embedded is classified into two kinds of information to be embedded having different characteristics. The respective kinds of information to be embedded are embedded in the first region and the second region separately so as to be extracted individually.

In the first region, there is embedded information to be extracted in real-time by usual scanning in copy operation such as the location information of an electronic document to be printed, print parameter information (N-up printing, resolution, compression and decompression, etc.), security information and the like. The extraction processing of the information embedded in the first region is always performed and delay of the extraction of the embedded information affects the total copy speed. Accordingly, analyzing the embedded information requires a speed similar to the scan speed, for example. Meanwhile, such information may have a small amount of information and the data size thereof may be small.

In the second region, there is embedded search information. The search information is, for example, object coordinate information in a page or a keyword, and used for object search. The search information is not used in the usual copying and extraction of the search information does not affect the copy speed. The search information extraction is not necessarily carried out in real-time and therefore analysis speed of the search information may be comparatively slow. Accordingly, the search information can include a lot of information.

For the LVBC in the present embodiment, in order to deal with such embedded information having different characteristics, the information to be embedded is embedded in a region where the first region and the second region are mixed. Further, the present embodiment selects three types of extraction depending on applications: extraction only from the first region, extraction only from the second region, and extraction from both of the regions. When the embedded information is extracted only from the first region, the extraction is carried out in a speed not to affect productivity of the copy operation by improving the analysis speed.

Figure 14:
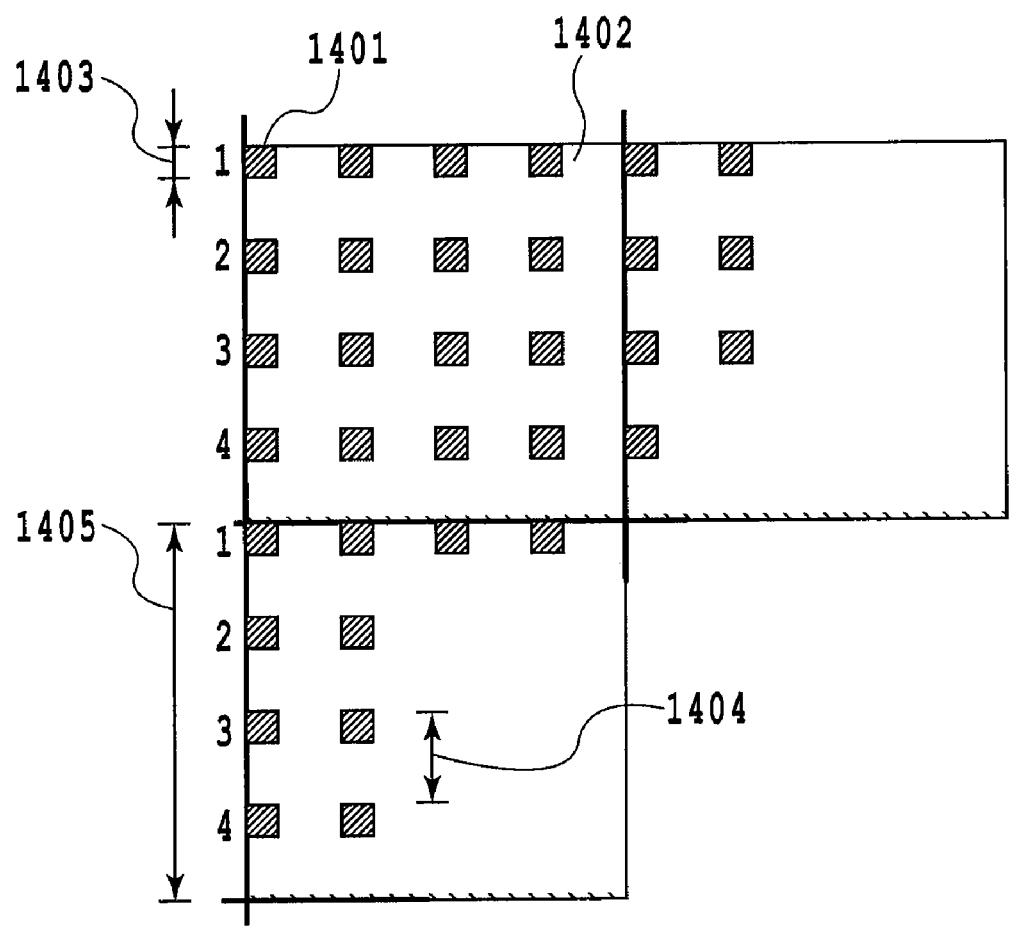
FIG. 14 is a diagram for illustrating arrangements of the first region and the second region.

FIG. 14 is a diagram for illustrating arrangements of the first region and the second region.

A square region indicated by Reference numeral 1401 shows the first region. While a plurality of same square regions is arranged periodically, the same information to be embedded is stored in each of the regions. By embedding the same information in the plurality of first regions in this manner, it is possible to improve redundancy of the embedded information and thereby to strengthen durability of the embedded information against noise or errors. Reference numeral 1403 and Reference numeral 1404 indicate a first region size and a first region repetition period, respectively.

A square indicated by Reference numeral 1402 shows the second region. The second region has a plurality of periodically arranged same square regions similarly to the first region. The above described two particular different kinds of information are embedded in the first region 1401 and the second region exclusively. Reference numeral 1405 indicates a second region size.

(LVBC Embedding Method)

Next, an embedding method of the LVBC will be described.

In an information embedding method using the LVBC, a hypothetical grid is used.

The information to be embedded is binary data within a certain size. The information to be embedded is embedded on a sheet as information by displacing a dot upward, downward, rightward, or leftward into any of eight directions from a grid point (shift disposition from a grid point).

Figure 15:
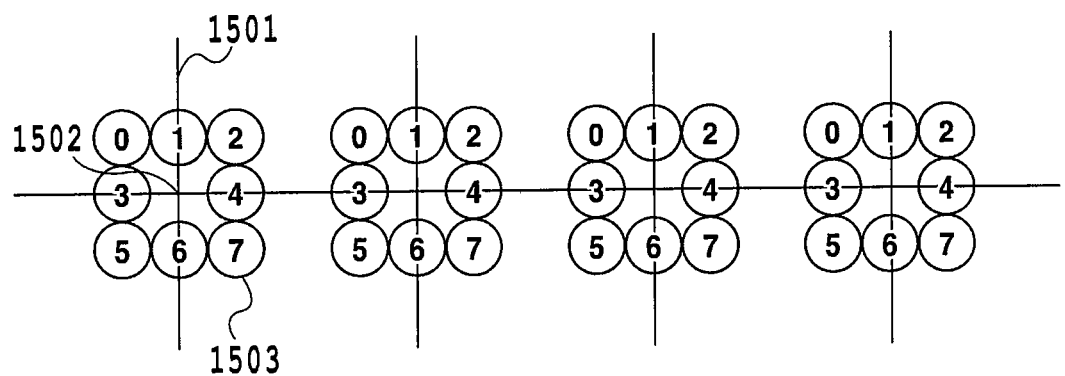
FIG. 15 is a diagram illustrating a positional relationship between a grid point and a dot disposition position.

FIG. 15 is a diagram illustrating a positional relationship between the grid point and the dot disposition position.

In FIG. 15, vertical and horizontal lines 1501 show the grid. Reference numeral 1502 indicates a grid point. The dot is not disposed at the grid point 1502. For example, the dot is disposed at a position apart from the grid point 1502 in the lower right direction.

Figure 16:
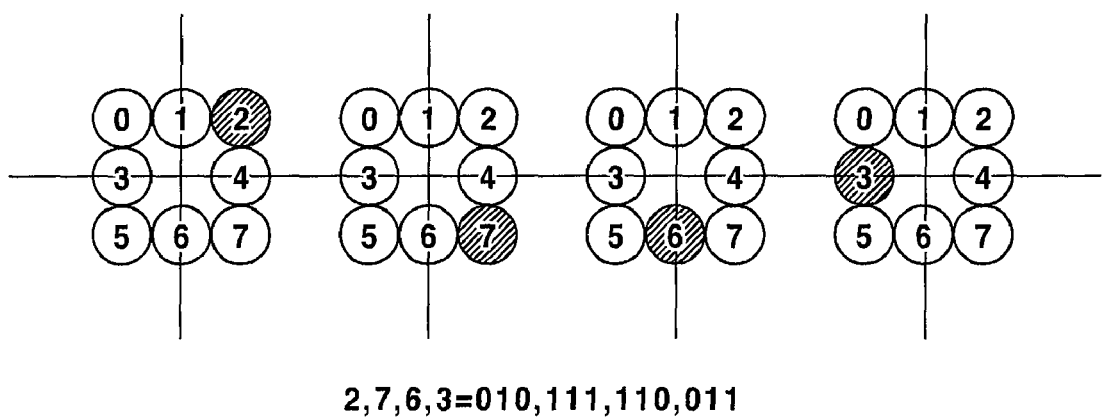
FIG. 16 is a diagram illustrating an example in which binary data of 010111110011 is embedded for the information to be embedded.

FIG. 16 is a diagram illustrating an example in which binary data of 010111110011 is embedded for the information to be embedded.

When the binary data of 010111110011 is embedded, the binary data is divided into three-bit units such as 010, 111, 110, and 011. Then, each of the three-bit units is converted from a binary number to a decimal number to obtain 2, 7, 6, and 3.

The information to be embedded is embedded by displacing each dot upward, downward, rightward, or leftward, into any of the eight directions from the grid point, according to the number expressing the information to be embedded. For example, when 2, 7, 6, and 3 are embedded as the information to be embedded, respective dots are displaced to the upper right, lower right, lower, and left. In FIG. 16, black circles indicate the dots. In the information embedding method using the LVBC, by repeating the above described embedding, it is possible to embed the information to be embedded having a information amount of about 2,000 Bytes into a sheet. Further, by embedding these dots representing the embedded information over the entire sheet, it is possible to improve the redundancy of the embedded information and to strengthen the durability against dirt on a sheet, and wrinkles and partial destruction of a sheet.

For analyzing the LVBC, first, a position of the grid needs to be detected accurately. Accordingly, it is preferable to make the dots representing the embedded information appear in the eight directions from the grid point with the same probability. However, when a particular value such as zero are frequently embedded as the information to be embedded, the dots representing the embedded information may not appear in the eight directions with the same probability. Accordingly, in the information embedding method using the LVBC, the information to be embedded is provided with scramble processing (e.g., common key cryptographic processing) having reversibility for the embedded information to obtain random dot displacements.

The information embedding method using the LVBC is considered to be a DA conversion which records digital data of the information to be embedded on a sheet as analog data, and can be realized by a relatively simple configuration.

(LVBC Analyzing Method)

Next, a LVBC analyzing method will be described.

Figure 17:
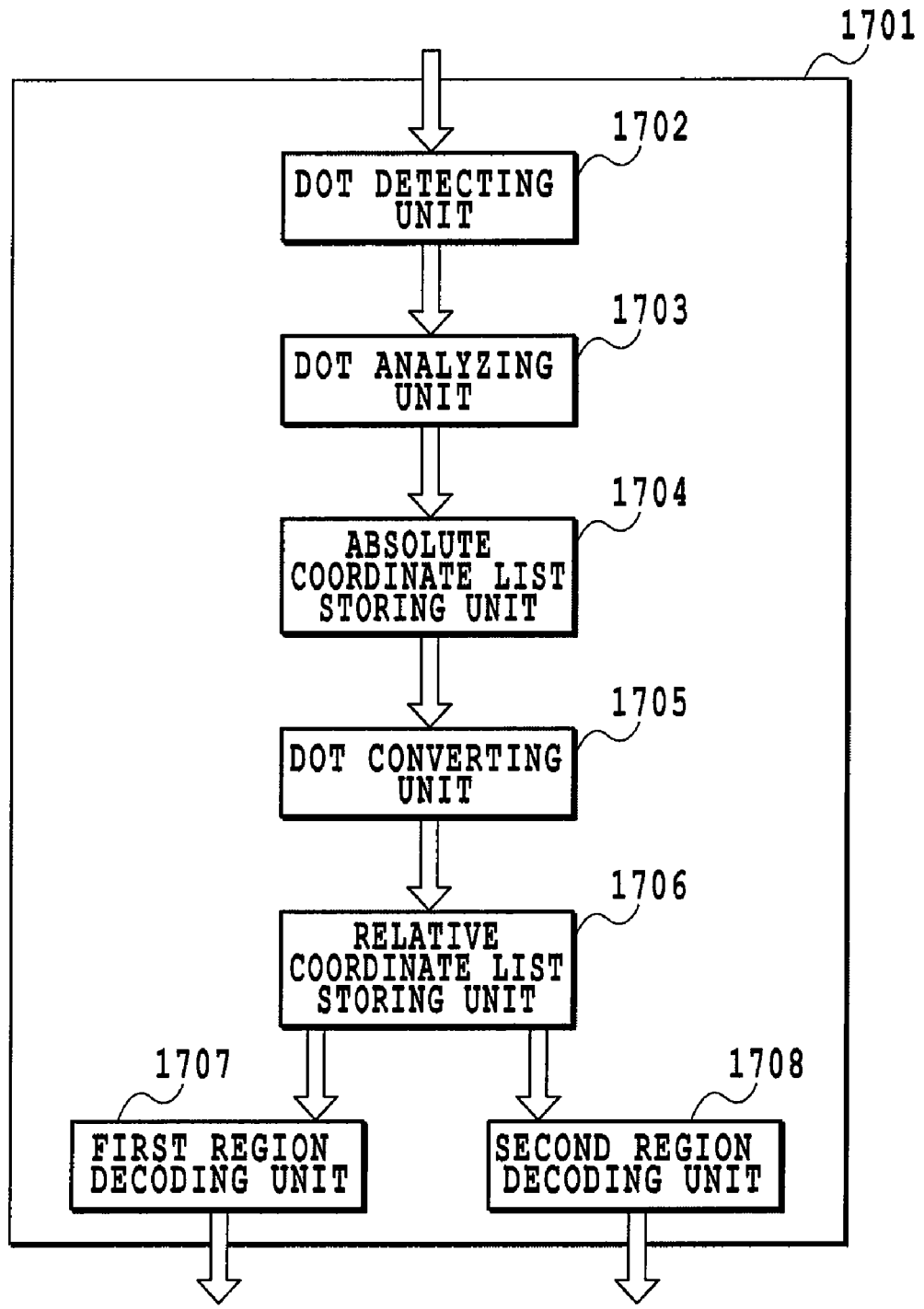
FIG. 17 is a block diagram illustrating a configuration of an embedded information analyzing unit 1701 analyzing the LVBC.

FIG. 17 is a block diagram illustrating a configuration of an embedded information analyzing unit 1701 analyzing the LVBC.

A dot detecting unit 1702 detects arbitrary dots from an image having the embedded information (image in which an original image and the embedded information are mixed) and obtains coordinate positions of the dots.

A dot analyzing unit 1703 removes unnecessary dots such as dots composing a halftone or the like from the dots detected by the dot detecting unit 1702.

An absolute coordinate list storing unit 1704 stores a list of the absolute coordinate positions of the dots.

A dot converting unit 1705 detects a rotation angle and a grid interval from the absolute coordinate position list stored in the absolute coordinate list storing unit 1704, and coverts the absolute coordinate positions into relative coordinate positions from the grid positions.

A relative coordinate list storing unit 1706 stores the relative coordinate positions.

A first region decoding unit 1707 extracts the embedded information embedded in the first region and outputs the extracted embedded information to a subsequent stage module.

A second region decoding unit 1708 extracts the embedded information embedded in the second region and outputs the extracted embedded information to the subsequent stage module.

The subsequent stage module is a functional module utilizing the embedded information, for example, a module changing the embedded information into a background image again to output a combined image or a module acquiring document information to perform reprint processing.

(Dot Detection)

Processing by the dot detecting unit 1702 will be described in detail.

The dot detecting unit 1702 receives an image scanned by the optical scanner in a format of a multi-value monochrome image. Meanwhile, the information to be embedded is embedded by binary monochrome dots in the information embedding method using the LVBC. Therefore, the dot detecting unit 1702 receives the signal in a slightly deteriorated state caused by influences of an attached toner amount in the information embedding, sheet handling, an optical system for scanning, etc. Accordingly, the dot detecting unit 1702, for eliminating these influences, recognizes the coordinate position by a received centroid position of the dot to improve detection accuracy.

Figure 18:
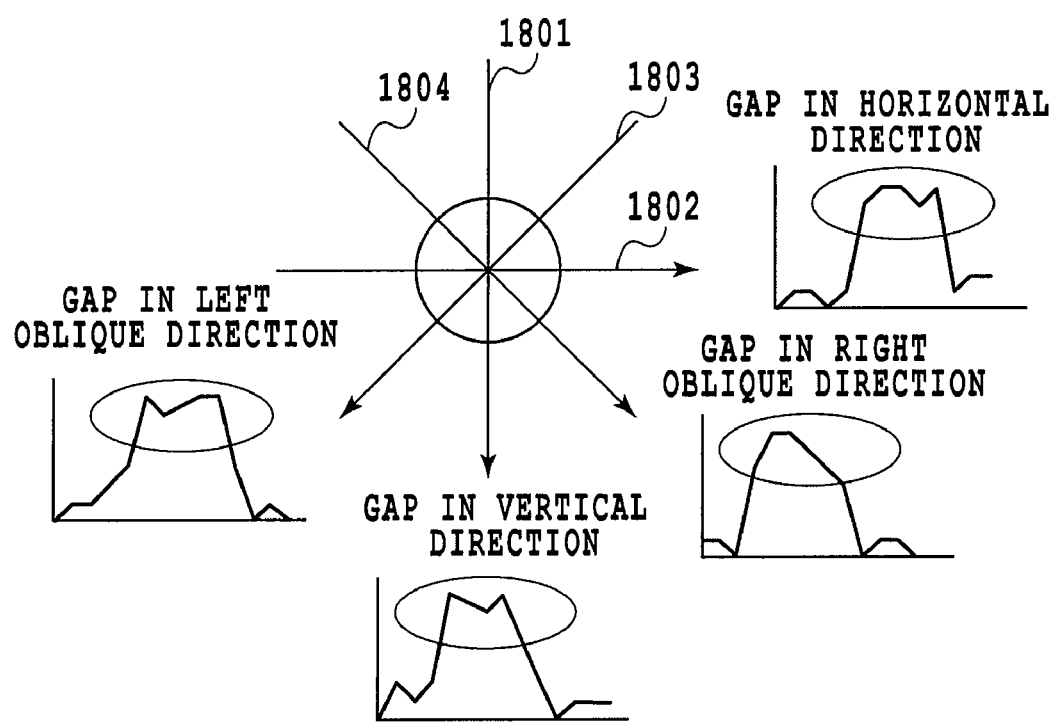
FIG. 18 is a conceptual diagram for illustrating dot detection by a dot detecting unit 1702.

FIG. 18 is a conceptual diagram for illustrating the dot detection by the dot detecting unit 1702.

The dot detecting unit 1702 performs gap inspection against the image along four directions for examining an isolated point on the image. Reference numerals 1801 to 1804 indicate the directions for examining whether an isolated point exists or not. For example, when an inspection result along a vertical direction 1801 is "white", "white", "black", "black, "white", and "white", the black portion is probably an isolated point. In this inspection alone, however, there remains a possibility that the isolated point is located on a horizontal line. Similarly, even when an isolated point is determined probably to be located on a horizontal line in an inspection result along the horizontal direction line 1802, there is a possibility that the isolated point is actually located on a vertical line. Accordingly, the dot detecting unit 1702 improves the detection accuracy by carrying out the isolated point inspection along the four directions 1801 to 1804. When the above described inspection results are obtained along all of the four directions 1801 to 1804 in a certain region, the black portion is recognized to be an isolated point.

(Dot Analysis)

Processing by a dot analyzing unit 1703 will be described in detail.

There is a case the dot detecting unit 1702 detects a dot other than a dot composing the LVBC. For example, a dot pattern expressing a halftone included in a document image, an isolated point originally included in a document (e.g., a voice sound mark of a Japanese syllabary character), or the like corresponds to the case. Accordingly, it is necessary to remove the halftone for eliminating the dot which is not a dot composing the LVBC.

Figure 19:
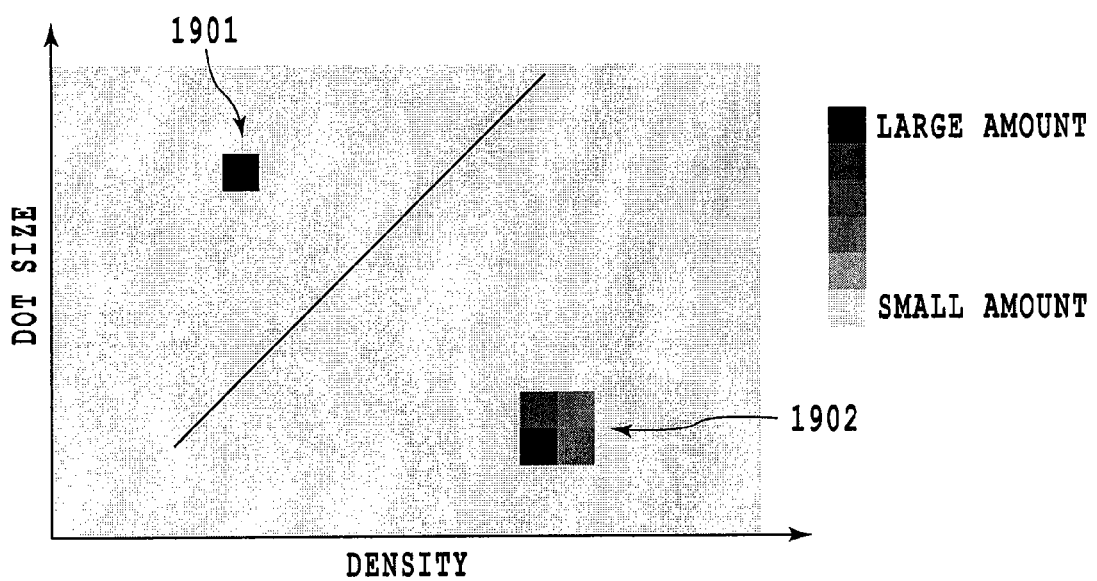
FIG. 19 is a diagram illustrating a graph for illustrating halftone removal.

FIG. 19 is a diagram illustrating a graph for illustrating the half tone removal.

The vertical axis of the graph indicates a dot size and the horizontal axis thereof indicates dot density. Also a histogram is shown in the graph to express a frequency of the dots by dot density. It is shown there that a dot appearance frequency is higher when the dot density is higher (darker). For the LVBC, the dots are embedded to have the same size and the same density and the dot appearance frequency has a peak in a narrow region in the graph (1901). On the other hand, for the halftone, the dot size and the dot density are not regulated, and the dots appear sparsely in a wide region of the graph and an appearance frequency thereof is relatively low. Therefore, the dot analyzing unit 1703, by utilizing this characteristic, determines dots having an appearance frequency peak in a narrow range in the graph to be the dots of the LVBC and eliminates other dots. Accordingly, the absolute coordinate list storing unit 1704 stores only the LVBC dots.

(Dot Conversion)

Processing by a dot converting unit 1705 will be described in detail.

An image angle in the scanning is different from an image angle when LVBC dots have been embedded in the printing, because of a difference in a sheet direction in the scanner or a slight shift of a sheet angle in an analog level. Therefore, it is necessary to perform rotation angle detection and angle correction of an image. Also, since the LVBC embeds information by displacing dots composing a grid upward, downward, rightward, and leftward, in eight directions, it is necessary to reconstruct the original grid. Therefore, it is necessary to identify the original grid interval accurately.

Figure 20:
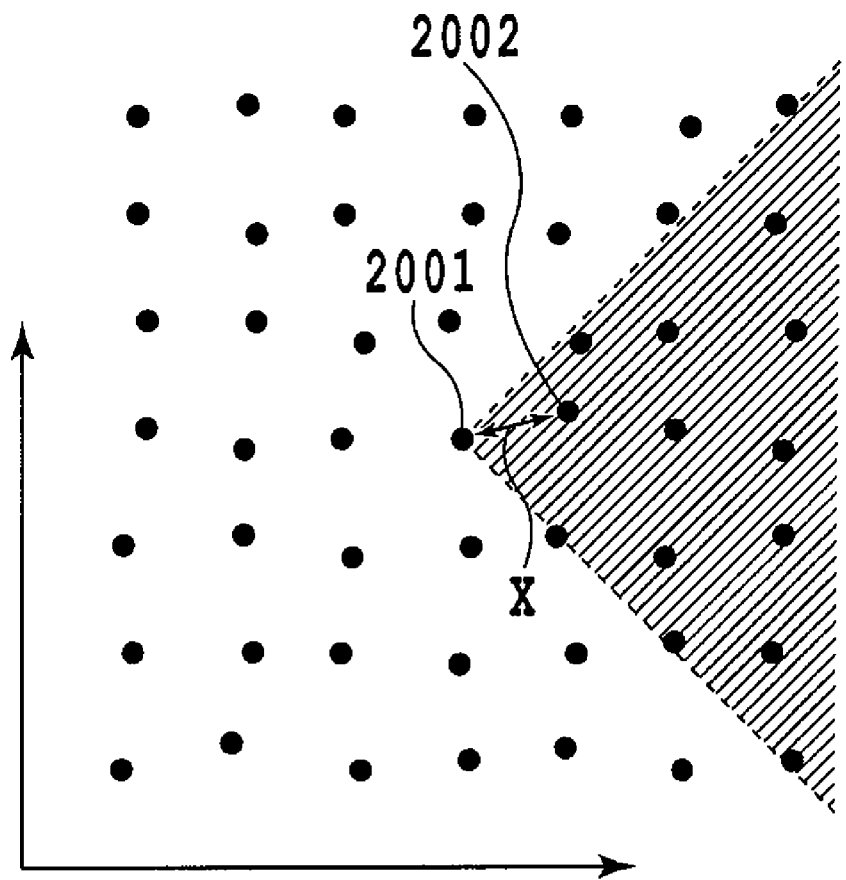
FIG. 20 is a schematic diagram illustrating a method of measuring a grid interval.

FIG. 20 is a schematic diagram illustrating a method of measuring the grid interval.

Focusing on a dot 2001, a distance X from the dot 2001 to a dot 2002 nearest to the dot 2001 is close to the grid interval.

While there are four dots located near the dot 2001 upward, downward, rightward, and leftward, only a dot located on the right side of the dot 2001 in a range of 90 degrees is made a candidate for the dot nearest to the dot 2001 for reducing a calculation amount. Specifically, when a relationship between a focused dot (x, y) and another arbitrary dot (a, b) satisfies $$a-x \leq 0 \text{ or } |a-x| \leq |b-y|,$$

the dot (a, b) is eliminated from the candidate. Then, a dot (a, b) having the smallest distance from the dot (x, y) is chosen to be the neighboring dot and the distance between the two dots X is made a candidate for the grid interval.

Here, the focused dot 2001 and also the neighboring dot 2002 are displaced. Also, dots recognized as dots of the LVBC actually might be dots of the halftone which the dot analyzing unit 1703 has failed to eliminate. Accordingly, the grid intervals are measured for all the focused dots (x, y) as described above and a histogram is generated expressing frequencies of the grid intervals for all the focused dots (x, Y).

Figure 21:
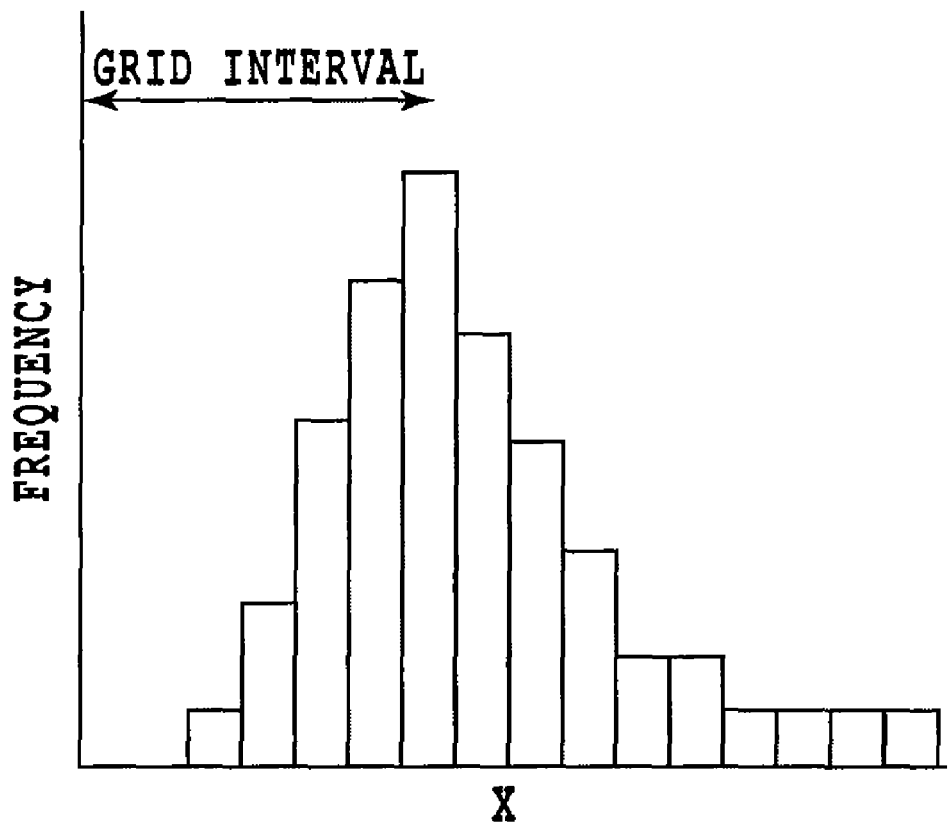
FIG. 21 is a diagram illustrating an example of a histogram expressing a frequency of grid intervals.

FIG. 21 is a diagram illustrating an example of the histogram expressing frequencies of the grid intervals.

In FIG. 21, the horizontal axis expresses a distance value which is a candidate for the grid interval, and the vertical axis expresses a frequency in which the distance is measured at the focused dots (x, y). The drawing shows that the distance X having the highest frequency is recognized to be the grid interval. That is, assuming that appearance probabilities of the focused dot 2001 and the neighboring dot 2002 is the same in both of the vertical and horizontal directions, it is possible to determine the distance X having the highest frequency to be the grid interval from the histogram of a number of focused dots.

Figure 22:
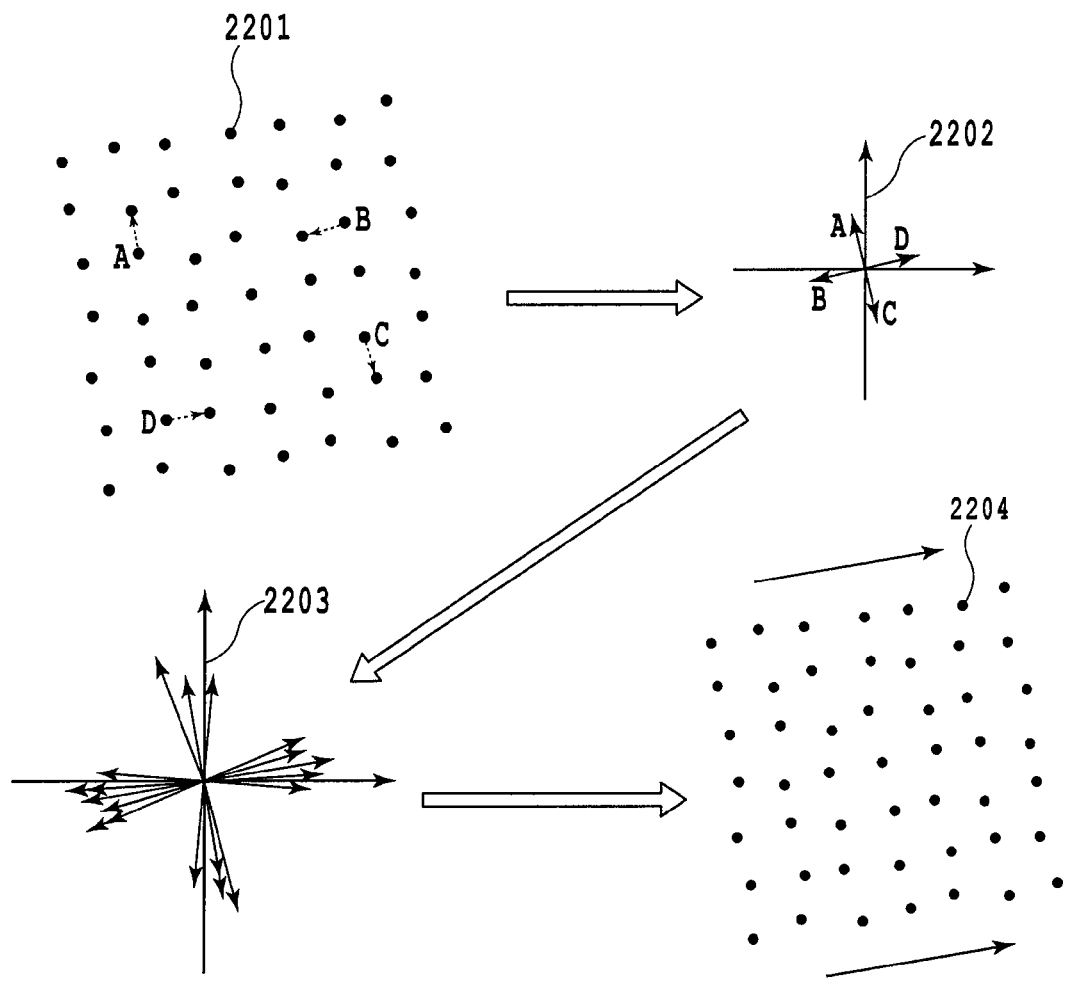
FIG. 22 is a diagram illustrating correction of a grid rotational angle.

FIG. 22 is a diagram illustrating correction of the grid rotation angle.

An angle from a dot to the neighboring dot thereof is measured for every dot in the drawing 2201.

Originally, an angle from a focused dot to the neighboring dot thereof should be any of 0, 90, 180, and 270 degrees and therefore it is possible to determine a rotation angle by correcting shifts of the measured angles. An angle θ from an individual focused dot to the neighboring dot is expressed by the following formula by defining a vector (dx, dy) from the focused dot to the neighboring dot thereof.

$$\theta = a\tan 2(dy, dx)$$

The drawing 2202 shows vectors to the respective neighboring dots, A, B, C, and D. Since the focused dots and also the neighboring dots are actually displaced slightly from the grid points, it is necessary to measure θ for every focused dot. Assuming that appearance probabilities of the displaced positions from the respective grid points of the focused dot 2201 and the neighboring dot thereof are the same in the vertical and horizontal directions, it is possible to measure the rotation angle of the grid in average by summing up angle shifts of all the focused dots. The drawing 2203 shows vectors of several dots and implies that the grid rotation angle can be approximated by overlapping these vector angles.

Specifically, the basic vector is calculated again from θ of each focused dot and a total angle φ is obtained from a summing up result of all the basic vectors. The summing up result (A, B) of the basic vectors is given as follows.

$$A = \sum_i \cos(4\theta_i)$$

$$B = \sum_i \sin(4\theta_i)$$

The grid rotation angle φ is approximated by the following formula.

$$\phi = a\tan 2(B, A)$$

For the absolute coordinate list stored in the absolute coordinate list storing unit 1704, grid angles are corrected by carrying out reverse rotation of the grid rotation angle.

A correction value of the rotation angle, while narrowed down to a rotation angle from every 90 degrees, is not yet narrowed down to a rotation angle from any of four angles, 0 (correct), 90, 180, or 270 degrees. This further narrowing-down will be described hereinafter.

Figure 23:
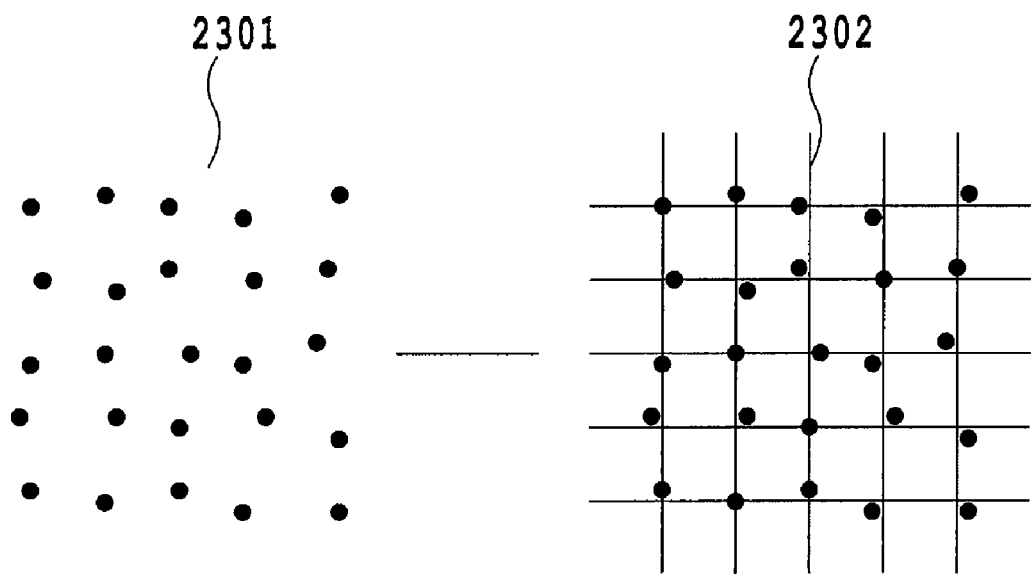
FIG. 23 is a diagram illustrating a rotation correction result and grid points.

FIG. 23 is a diagram illustrating a rotation correction result and the grid points.

In FIG. 23, the drawing 2301 shows the absolute coordinate list of the LVBC dots after the rotation correction thereof has been completed. Further, as shown in the drawing 2302, hypothetical lines are drawn in every grid interval obtained in the dot converting unit 1705 in the X direction and Y direction, respectively, and intersections of the lines are assumed to be grid points. The displacement of dot coordinates is measured from this grid point.

(Identification of the First Region)

There will be described processing to identify the first region size 1403 and region repetition period 1404 shown in FIG. 14, and the first region position.

First, the repetition period 1404 of the first regions 1401 is determined. The first regions 1401 include the same data periodically and, when an autocorrelation is measured against the vertical direction with a certain offset, the autocorrelation becomes strong at an offset value equal to the repetition period 1404 to determine the repletion period 1404.

Figure 24:
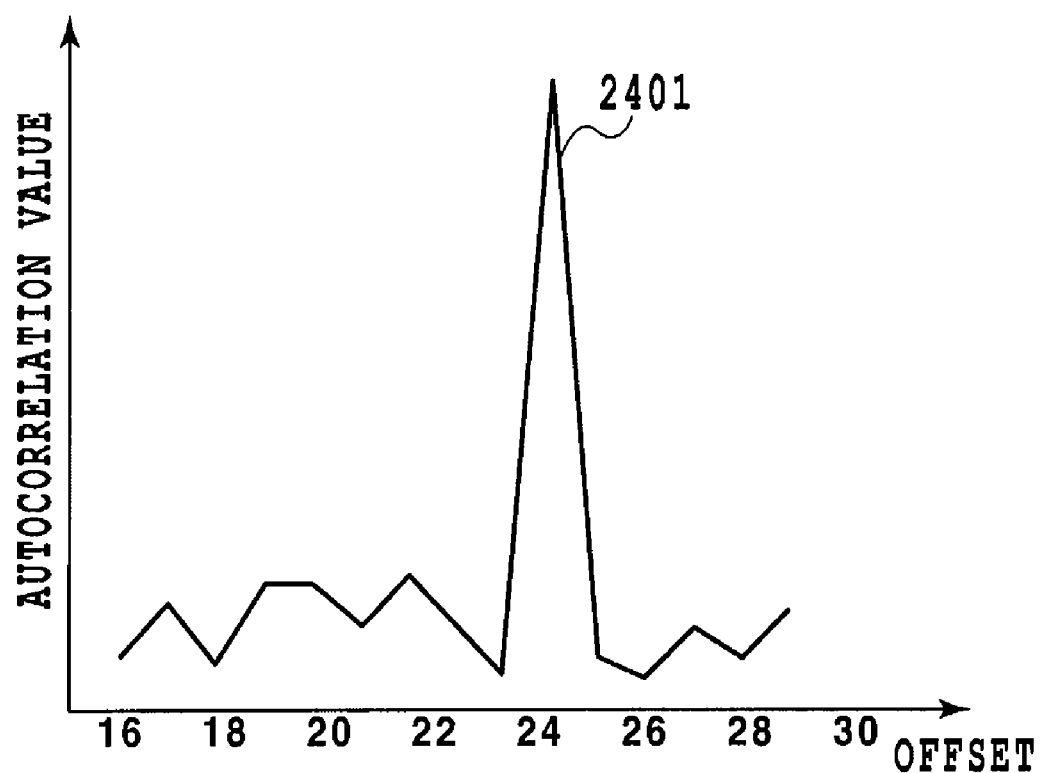
FIG. 24 is a graph illustrating an example of calculated autocorrelation values against offset values.

FIG. 24 is a graph illustrating an example of calculated autocorrelation values against offset values.

The autocorrelation is a method to evaluate a frequency of particular embedded data appearing periodically and the autocorrelation value is a value to evaluate similarity of the embedded data at a particular offset value.

An autocorrelation function COR (A, B) for calculating the autocorrelation value is given by the following arithmetic expression.

$$COR(A, B) = \text{bitcount}(\text{not}(A \text{ xor } B)),$$

where "xor" indicates an exclusive OR of two terms and "not" indicates negation.

"bitcount" is a function to count the number of 1 in a bit sequence.

For example, when A is 010b and B is 011b, not (A xor B)=not (001b)=110b and "bitcount" becomes 2.

Here, it is assumed that the first region is a matrix having predetermined width and height and a bit sequence for evaluating the first region is CELL (x, y), where x and y are vertical and horizontal coordinates, respectively. For example, when the first region size is 8 in width and 8 in height, CELL (x, y) has a bit sequence length of 3 bits×8×8=192 bits for the first region having (x, y) at an upper left corner.

Here, the autocorrelation value for all the coordinates at a certain offset is expressed by the following function.

$$\text{Autocorrelation value}(\text{Offset}) = \Sigma_x \Sigma_y (\text{COR}(\text{CELL}(x, y), \text{CELL}(x, y\text{-offset})))$$

When the autocorrelation is calculated assuming that the first region size 1403 is 8 and the repetition period 1404 is 8×3=24, for example, the autocorrelation value has a peak 2401 at an offset of 24 and it is possible to determine the offset value of 24 to be the repetition period 1404.

Next, the position and size of the first region 1401 are determined. While the repetition period of the first regions has been determined by a measurement of the autocorrelation, it is necessary to determine a position in the period where the first region exists and the size of the first region.

Figure 25:
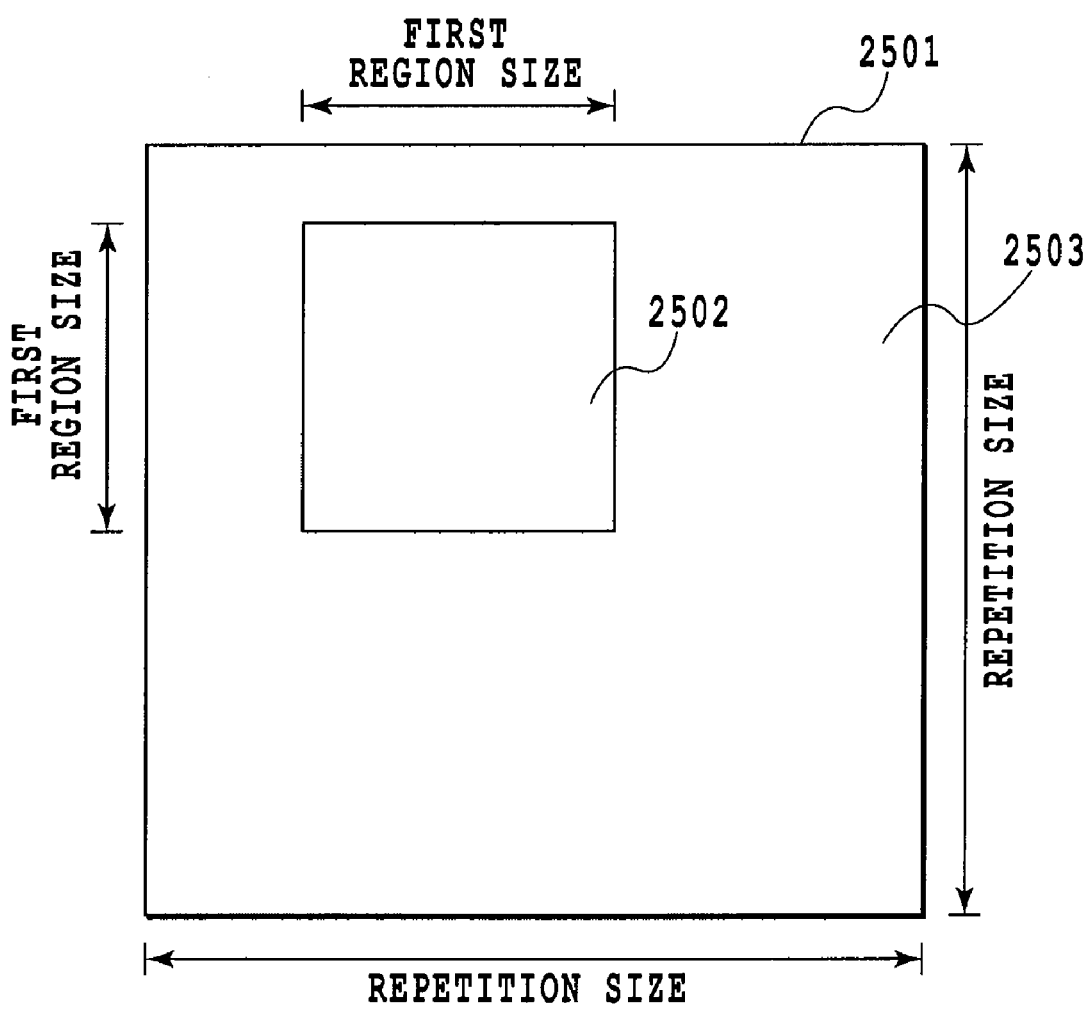
FIG. 25 is a diagram for illustrating a method of determining a position of the first region.

FIG. 25 is a diagram for illustrating a method to determine the position of the first region.

Since the repetition period of the first regions has been already determined, an arbitrary regions having the same repetition period is cut out from the relative coordinate list storing unit 1706. Subsequently, a correlation is measured in regions neighboring on the regions, then a correlation is measured in further neighboring regions, and such processing is repeated. In this processing, portions of the first region 2502, where the same data appears in the repetition period, show a strong correlation. Other regions in the second region 2503, where the same data does not appear in the repetition period, show a weak correlation. Utilizing these characteristics, a start position of the portions having a strong correlation is identified to be a start position of the first region and a size to an endpoint of the portions having the strong correlation is determined to be a size of the first region.

(Decoding of the First Region)

The data in the first region is decoded using the position and size of the first region identified in the above described processing.

When only data in a single region is decoded, there is a possibility of misjudgment caused by measurement errors or noise. Accordingly, the positions of the dots embedded in all the first regions are counted, the most frequent value is employed and an occurrence probability of the value is calculated.

Figure 26:
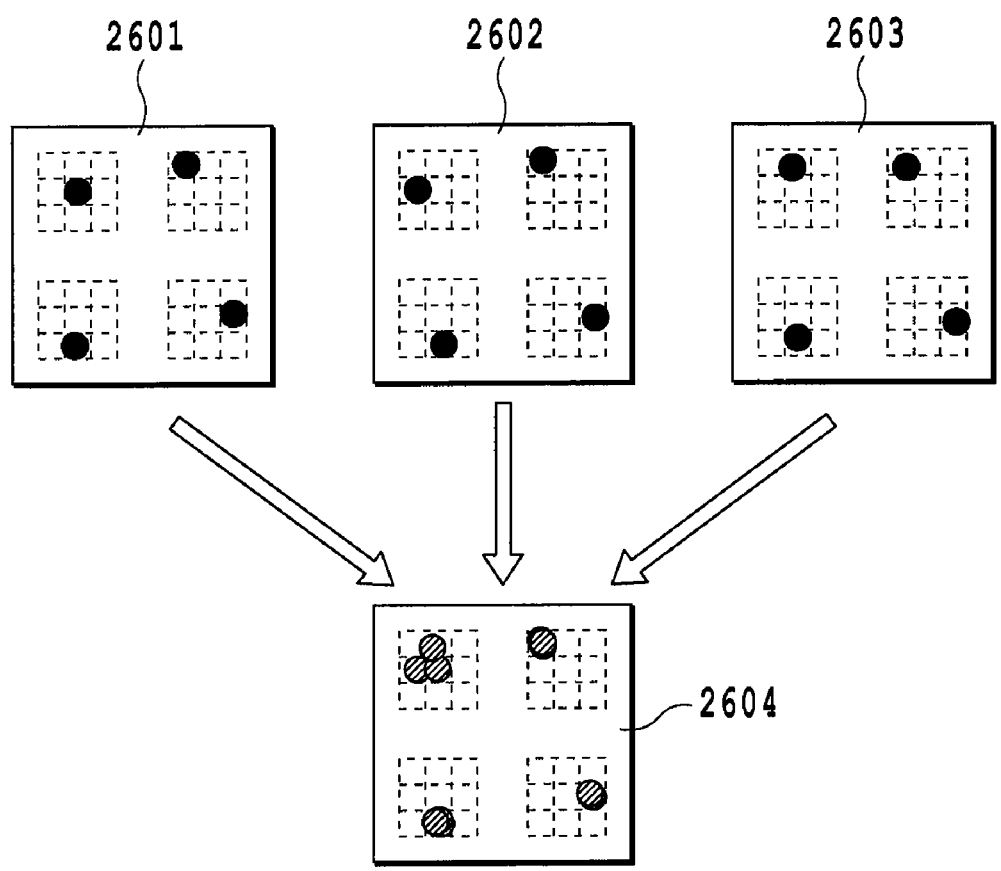
FIG. 26 is a schematic diagram for illustrating counting of the first region.

FIG. 26 is a schematic diagram for illustrating position counting of the dots embedded in the first regions.

In FIG. 26, Reference numerals 2601 to 2603 indicate the first regions located in different positions on a sheet. Reference numeral 2604 shows a result overlapping these first regions. While some shifts caused by noise or errors are recognized, the most frequent value is determined from a counting result of all the regions and therefore this value can be utilized.

Next, substantial decoding processing is performed. In this stage, influence of noise or measurement errors can not be perfectly eliminated, and the decoding processing is performed providing error correction processing to the decoded result.

First, the dot positions are detected from the dot patterns shown in FIG. 16 and converted into data corresponding to the positions, and a data sequence embedded in the first regions is extracted. In this data sequence, an error correction code, which detects data destruction and repairs the data destruction if possible, is recorded in the embedding other than copy prohibition data for an actual use.

While many error correction codes have been developed as well known techniques, this embodiment employs the LDPC (Low Density Parity Check) method. The LDPC is known to have a high error correction capability and to show characteristics close to the Shannon limit. Detailed description of the LDPC will be omitted. Also, any method other than the LDPC may be used as far as a function of the error correction code is provided.

It is possible to extract the embedded data using the error correction code even when the extracted grid includes a certain extent of errors or noise.

Further, as described in the rotation angle correction, the rotation angle correction is performed every 90 degrees and therefore there are four possible cases; data extracted here is correct data, data rotated by 90 degrees, data rotated by 180 degrees, or data rotated by 270 degrees from the correct data. Accordingly, decoding is carried out for the potential results in no rotation, 90 degree rotation, 180 degree rotation and 270 degree rotation of the extracted data performing the error correction by the LDPC. The error correction code functions effectively only in a correct rotation angle and it is possible to extract the data in a normal manner.

Figure 27:
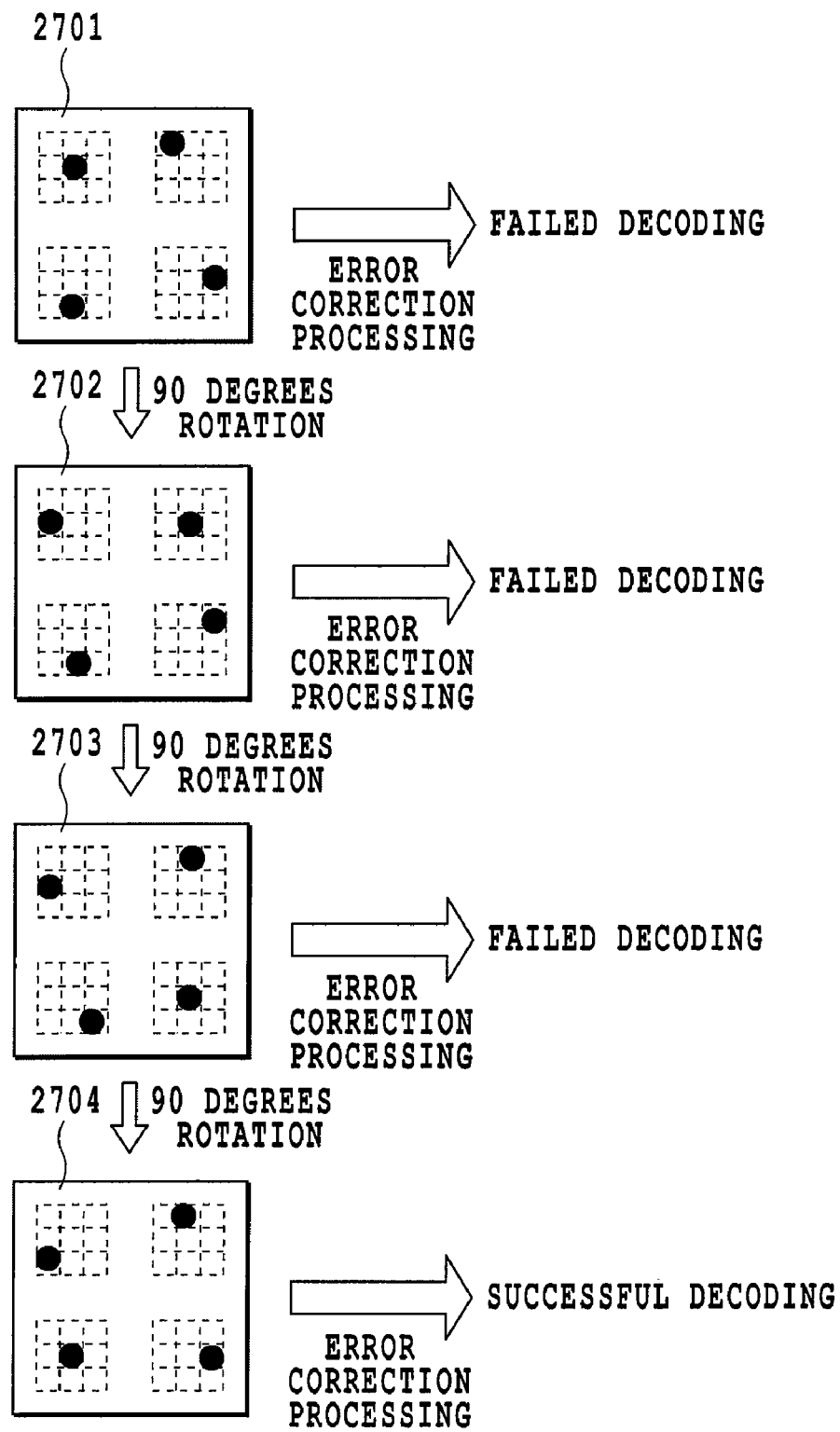
FIG. 27 is a diagram for illustrating decoding processing which performs error correction in consideration of rotation.

FIG. 27 is a diagram for illustrating decoding processing which performs the error correction in consideration of the rotation.

FIG. 27 shows an example in which the result of 270 degree rotation is extracted for the correct data. First, in the drawing 2701, the error correction processing is performed for the extracted data as is. While the correct data includes the error correcting code, the code becomes meaningless data by the rotation and can not correct errors. Then, in the drawing 2702, the error correction processing is performed for the data provided with a 90 degree rotation from the case shown in the drawing 2701. Similarly the error correction fails and the data can not be extracted. Then, in the drawing 2703, the error correction processing is performed for the data provided with a 90 degree rotation from the case shown in the drawing 2702. Similarly, the error correction fails and the data can not be extracted. Lastly, in the drawing 2704, the error correction is performed for the data provided with a 90 degree rotation from the case shown in the drawing 2703. Since this data is the correct data, the error correction succeeds and this data can be employed as an extracted data.

When the error correction has failed even in the drawing 2704, there is a possibility that the data extraction has failed because of a lot of errors or noise.

The embedded data stored in the first region can be extracted by the above processing.

(Identification of the Second Region)

The second region is a region used for registration of tracking information or the like and includes information which is not always required for performing copy operation. Accordingly, by omitting the decoding of the second region if not necessary, it is possible to suppress a speed reduction of the total processing.

An identification method of the second region will be described below.

First, similarly to the first regions, an autocorrelation is measured for the second regions. Since in the second regions embedding is performed in a period which is a plurality of the repetition period of the first regions, the autocorrelation may be measured in every any plurality of number of the repetition period of the first regions (24, 48, 72, . . . for the foregoing example) and some of the calculations can be omitted. Further, the repetition period of the second regions is the same as the size of the second region.

Figure 28:
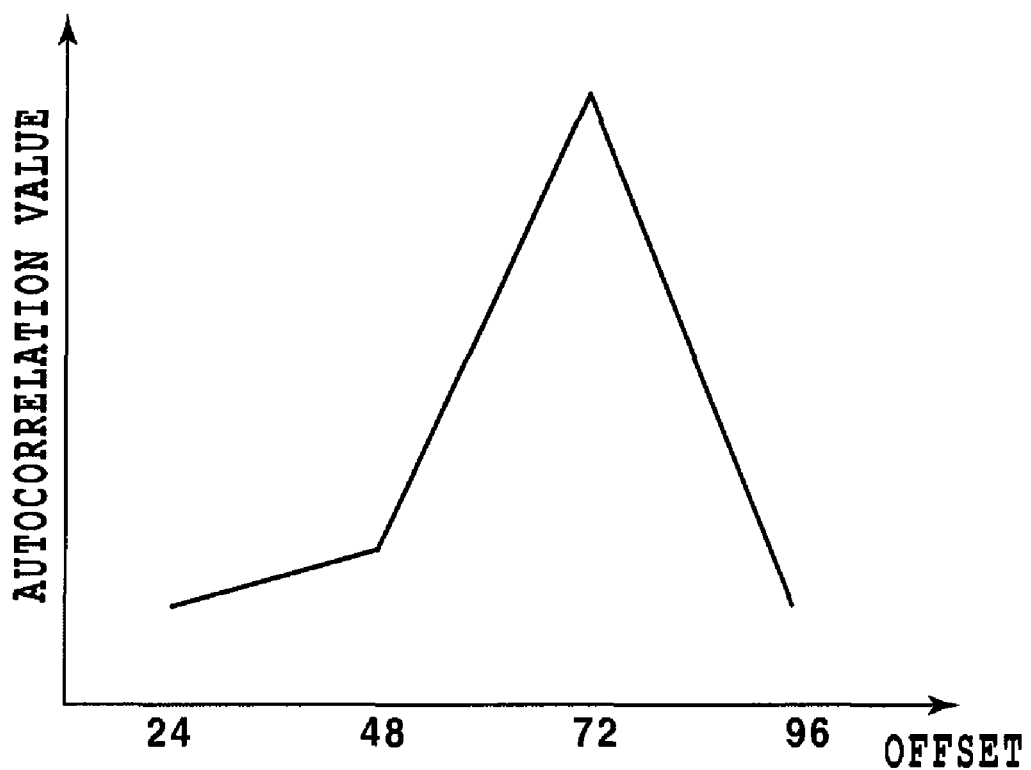
FIG. 28 is a graph illustrating an example of calculated autocorrelation values against offset values in the second regions.

FIG. 28 is a graph illustrating an example of calculated autocorrelation values against offset values in the second regions.

Lastly, a start position of the second region is identified. Since the start position of the first region and the start position of the second region are synchronized in the embedding, the position can be narrowed down to any of the start position of the first region.

The error correction code is utilized for determining the position of the second region. Similar to the case of the first region, the error correcting code is added other than the embedded data for the second region. Sine the size of the second region is already known, the error correction processing is performed sequentially for potential regions from a top position of the first regions.

Figure 29:
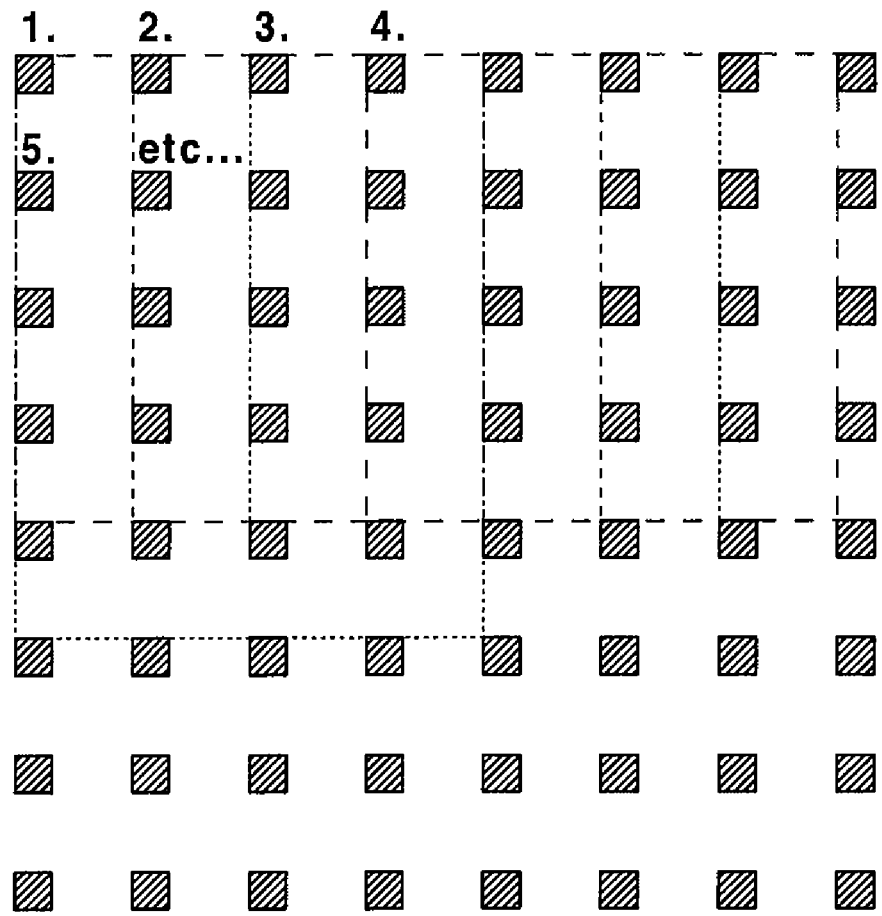
FIG. 29 is a diagram for illustrating a method of determining a position of the second region.

FIG. 29 is a diagram for illustrating a method for identifying the second region position.

In FIG. 29, the autocorrelation shows that the second region size is four times the repetition period of the first regions. Here, any of 4×4=16 is to be the start position of the second region, and the error correction processing is applied by shifting the position as 1, 2, 3, 4, 5, etc. When the error correction processing has succeeded, it is possible to employ the position as the second region position.

The embedded data stored in the second regions can be extracted by the above processing.

(Other Embodiments)

A processing method storing a program, which realizes the function of the foregoing embodiment, in a recording medium, reading the program stored in the recording medium as a code, and executing the code in a computer falls within a scope of the foregoing embodiment. Also, not only the computer-readable recording medium storing the above program but also the program itself is included in the foregoing embodiment. Such recording media include a floppy disk, hard disk, optical disk, magneto-optical disk, CD-ROM, magnetic tape, nonvolatile memory card, and ROM, for example. Also, other than the method that executes processing by a single program stored in the above recording medium, a method that operates on an OS in conjunction with other software or a function of an extension board to execute operation of the foregoing embodiment also falls within the scope of the foregoing embodiment.

Other program supply methods include a method to download a program or a file including a compressed auto-install function from a homepage on the Internet into a recording medium such as a hard disk using a browser of a client computer. Also, the program supply can be realized by dividing program codes composing the program of the present invention into a plurality of files and downloading the respective files from different homepages. That is, a www sever, enabling a plurality of users to download a program file for realizing the processing of the function in the present invention by a computer, also falls within the scope of the present invention.

Further, by distributing recording media such as CD-ROMs storing the above encrypted program to users, it is possible to allow users who have cleared a certain condition to download key information for decryption from the Internet, to decrypt the encrypted program by using the key information, and to install the program in a computer.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-160339, filed Jun. 18, 2007, which is hereby incorporated by reference herein in its entirety.

What is claimed is:

1. A two-dimensional code generating device, comprising:
   an acquisition component for acquiring information to be embedded in each page as a printed two-dimensional code;
   a determination component for determining whether a plurality of pages are to be printed on one sheet;
   a merger component for, when it is determined that the plurality of pages are to be printed on one sheet, merging pieces of information that were to be embedded as separate two-dimensional codes in respective pages of the plurality of pages; and
   a generation component for generating image data for one two-dimensional code from the merged information obtained from the merger component, the one two-dimensional code being printed on the one sheet in place of the separate two-dimensional codes corresponding to the merged pieces of information,
   wherein a memory for storing the information is included in the device.

2. The two-dimensional code generating device of claim 1, wherein
   when there is information common to the plurality of pages in the pieces of information to be embedded as the two-dimensional codes, the merger component merges the pieces of information to be embedded so as not to embed the common information redundantly.

3. A two-dimensional code generating device, comprising:
   an acquisition component for acquiring information to be embedded in each page as a printed two-dimensional code;
   a determination component for determining whether a plurality of pages are to be printed on one sheet;
   a merger component for, when it is determined that the plurality of pages are to be printed on one sheet, merging pieces of information, which were to be embedded in respective pages of the plurality of pages as separate two-dimensional codes, into a single piece of information; and
   a generation component for generating image data for one two-dimensional code from the single piece of information obtained from the merger component, the one two-dimensional code being printed on the one sheet in place of the separate two-dimensional codes corresponding to the merged pieces of information,
   wherein a memory for storing the information is included in the device.

4. A two-dimensional code generating device, comprising:
   a determination component for determining whether a first information to be embedded as a first two-dimensional code and a second information to be embedded as a second two-dimensional code are printed on one sheet;
   a generation component for generating image data for the first two-dimensional code from the first information and generating image data for the second two-dimensional code from the second information when both of the first information and the second information are determined not to be printed on one sheet; and
   a merger component for merging the first information and the second information into a single piece of information and generating image data for one two-dimensional code from the single piece of information when both of the first information and the second information are determined to be printed on one sheet, the one two-dimensional code being printed on the one sheet in place of the first and second two-dimensional codes,
   wherein a memory is included in the device.

5. A two-dimensional code generating method, comprising the steps of:
   acquiring information to be embedded in each page as a printed two-dimensional code;
   determining whether a plurality of pages are to be printed on one sheet;
   merging, when it is determined that the plurality of pages are to be printed on one sheet, pieces of information that were to be embedded as separate two-dimensional codes in respective pages of the plurality of pages; and
   generating image data for one two-dimensional code from the merged information obtained in the merging step, the one two-dimensional code being printed on the one sheet in place of the separate two-dimensional codes corresponding to the merged pieces of information.

6. The two-dimensional code generating method of claim 5, wherein
   when there is information common to the plurality of pages in pieces of information to be embedded as the two-dimensional codes, the merging step merges the pieces of information to be embedded so as not to embed the common information redundantly.

7. A two-dimensional code generating method, comprising the steps of:
   acquiring information to be embedded in each page as a printed two-dimensional code;
   determining whether a plurality of pages are to be printed on one sheet;
   merging, when it is determined that the plurality of pages are to be printed on one sheet, pieces of information that were to be embedded in respective pages of the plurality of pages as separate two-dimensional codes, into a single piece of information; and
   generating the image data for two dimensional code from the single piece of information obtained in the merging step, the one two-dimensional code being printed on the one sheet in place of the separate two-dimensional codes corresponding to the merged pieces of information.

8. A two-dimensional code generating method, comprising the steps of:
   determining whether a first information to be embedded as a first two-dimensional code and a second information to be embedded as a second two-dimensional code are to be printed on one sheet;
   generating image data for the first two-dimensional code from the first information and generating image data for the second two-dimensional code from the second information, when both of the first information and the second information are determined not to be printed on one sheet; and merging the first information and the second information into a single piece of information and generating image data for one two-dimensional code for printing from the single piece of information, when both of the first information and the second information are determined to be printed on one sheet, the one two-dimensional code being printed on the one sheet in place of the first and second two dimensional codes.

9. A printing device for generating data for printing N pages of print data on one sheet when N-up printing is designated for the print data, the printing device comprising:

a component for acquiring each piece of information to be separately embedded as background image data in association with each page in the print data;

a component for analyzing the each piece of information to be embedded;

a component for merging the pieces of information to be separately embedded in association with respective N pages to be printed on the one sheet when the N-up printing has been determined to be designated in the analysis; and a component for generating merged background image data from the information obtained by the merging, which merged background image data is to be embedded in the one sheet in place of the separately embedded background image data associated with each page, and combining the merged background image data with the print data, wherein a memory for storing the information is included in the device.

10. The printing device of claim 9, wherein the component for analyzing each piece of information to be embedded includes a component for determining whether each parameter of common items in the pieces of information to be embedded of M ($1 \leq M \leq N$) pages is the same; and wherein the component for merging the pieces of information to be embedded includes:

a component for generating one common parameter for the common item when the each parameter is determined to be the same;

a component for generating parameters specific to the respective pages for the common item when the each parameter is determined not to be the same; and a component for generating the information to be embedded based on the generated parameters.

11. A printing method for generating data for printing N pages of print data on one sheet when N-up printing is designated for the print data, the method comprising the steps of:

acquiring each piece of information to be separately embedded as background image data in association with each page in the print data;

analyzing the each piece of information to be embedded;

merging the pieces of information to be separately embedded in association with respective N pages to be printed on the one sheet when the N-up printing has been determined to be designated in the analysis; and generating merged background image data to be printed on from the information obtained by the merging, which merged background image data is to be embedded in the one sheet in place of the separately embedded background image data associated with each page, and combining the merged background image data with the print data.

12. The printing method of claim 11, wherein the step of analyzing each piece of information to be embedded includes the step of determining whether each parameter of common items in the pieces of information to be embedded of M ($1 \leq M \leq N$) pages is the same; and wherein the step of merging the information to be embedded includes the steps of:

generating one common parameter for the common item when the each parameter is determined to be the same;

generating parameters specific to the respective pages for the common item when the each parameter is determined not to be the same; and generating the information to be embedded based on the generated parameters.

13. A non-transitory computer-readable recording medium having computer-executable instructions for performing a method, the method comprising the steps of:

acquiring information to be embedded in each page as a printed two-dimensional code;

determining whether a plurality of pages are to be printed on one sheet;

merging, when it is determined that the plurality of pages are to be printed on one sheet, pieces of information that were to be embedded in each page of a plurality of pages as separate two-dimensional codes in respective pages of the plurality of pages; and generating image data for one two dimensional code for printing from the merged information obtained in the merging step, the one two-dimensional code being printed on the one sheet instead of the separate two-dimensional codes corresponding to the merged pieces of information.

14. A non-transitory computer-readable recording medium having computer-executable instructions for performing a method, the method comprising the steps of:

determining whether a first information to be embedded as a first two-dimensional code and a second information to be embedded as a second two-dimensional code are to be printed on one sheet;

generating image data for the first two-dimensional code from the first information and generating image data for the second two-dimensional code from the second information, when both of the first information and the second information are determined not to be printed on one sheet; and merging the first information and the second information into a single piece of information and generating image data for a single two-dimensional code from the single piece of information, when both of the first information and the second information are determined to be printed on one sheet, the one two-dimensional code being printed on the one sheet in place of the first and second two-dimensional codes.

15. A non-transitory computer-readable recording medium having computer-executable instructions for performing a method for generating data to print N pages of print data on one sheet when N-up printing is designated for the print data, the method comprising the steps of:

acquiring each piece of information to be separately embedded as background image data in association with each page in the print data;

analyzing the each piece of information to be embedded;

merging the pieces of information to be separately embedded in association with respective N pages to be printed on the one page when the N-up printing has been determined to be designated in the analysis; and generating merged background image data from the information obtained by the merging, which merged background image data is to be embedded in the one sheet in place of the separately embedded background image data associated with each page, and combining the background image data with data corresponding to a background image in the print data.

* * * * *